United States Patent [19]

Tzikas et al.

[11] Patent Number: 5,023,326
[45] Date of Patent: Jun. 11, 1991

[54] REACTIVE DYES CONTAINING THE 2-(CYANO, CARBONAMIDO, SULFO-, HYDROXY- OR SULFATO-C₂-C₅-ALKYLENEAMINO)-6-SULFO- OR 3,6-DISULFO-8-HYDROXYNAPHTHYL-(1) COUPLING COMPONENT

[75] Inventors: Athanassios Tzikas, Pratteln; Herbert Seiler, Riehen, both of Switzerland

[73] Assignee: Ciba-Geigy Corporation, Ardsley, N.Y.

[21] Appl. No.: 435,222

[22] Filed: Nov. 9, 1989

[30] Foreign Application Priority Data

Nov. 16, 1988 [CH] Switzerland .......................... 4261/88

[51] Int. Cl.⁵ .................... C09B 62/028; C09B 62/45; D06P 1/382; D06P 1/384
[52] U.S. Cl. .................... 534/638; 534/582; 534/593; 534/598; 534/612; 534/617; 534/641; 534/642; 534/643; 534/887; 544/208; 544/210; 544/391; 558/25; 558/30; 558/33
[58] Field of Search .............. 534/612, 617, 638, 641, 534/642, 643

[56] References Cited

U.S. PATENT DOCUMENTS

| | | | |
|---|---|---|---|
| 3,142,669 | 7/1964 | Feeman | 534/643 X |
| 3,488,343 | 1/1970 | Montmollin et al. | 534/643 |
| 3,494,911 | 2/1970 | Montmollin | 534/643 X |
| 3,925,351 | 12/1975 | Meininger et al. | 534/642 |
| 4,036,825 | 7/1977 | Fuchs et al. | 534/642 |
| 4,134,887 | 1/1979 | Fuchs et al. | 534/642 |
| 4,560,388 | 12/1985 | Rohrer | 534/643 X |
| 4,855,410 | 8/1989 | Oxenius et al. | 534/643 X |

FOREIGN PATENT DOCUMENTS

| | | | |
|---|---|---|---|
| 0208655 | 1/1987 | European Pat. Off. | 534/643 |
| 0241104 | 10/1987 | European Pat. Off. | 534/642 |
| 0282443 | 9/1988 | European Pat. Off. | 534/643 |

*Primary Examiner*—Floyd D. Higel
*Assistant Examiner*—Fiona T. Powers
*Attorney, Agent, or Firm*—George R. Dohmann; Edward McC. Roberts

[57] ABSTRACT

Reactive dyes of the formula

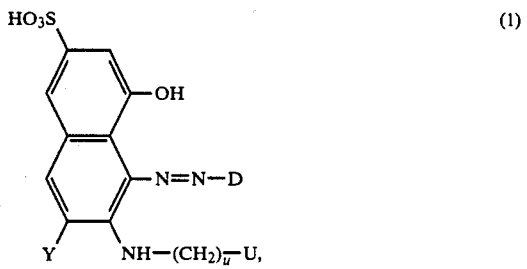

(1)

in which Y is hydrogen or sulfo, U is —CN, —CONH₂, —SO₃H, —OH or —OSO₃H, D is a phenyl or naphthyl radical, which can be substituted by $C_1$-$C_4$alkyl, $C_1$-$C_4$alkoxy, halogen, carboxyl and sulfo, and which contains at least one reactive radical bound direclty or via a bridge member to a ring carbon atom, or to which a further radical is bound which contains a reactive radical, and u is the number 2, 3, 4 or 5, are suitable in particular for the dyeing or printing of cellulose-containing fiber materials by the exhaust method or by the continuous method and product in combination with a high colorisitc yield dyeings and prints which have good fastness properties.

23 Claims, No Drawings

REACTIVE DYES CONTAINING THE 2-(CYANO, CARBONAMIDO, SULFO-, HYDROXY- OR SULFATO-C₂-C₅-ALKYLENEAMINO)-6-SULFO- OR 3,6-DISULFO-8-HYDROXYNAPHTHYL-(1) COUPLING COMPONENT

The present application relates to novel improved reactive dyes which are suitable in particular for the dyeing of cellulose-containing fibre materials by the exhaust method or the cold pad-batch method and which produce wet and light fast dyeings: also to processes for the preparation of these dyes and their use for the dyeing or printing of textile material.

The invention relates to reactive dyes of the formula

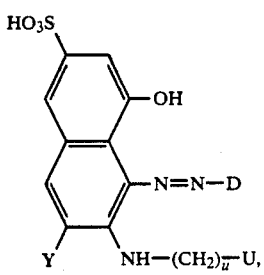 (1)

in which Y is hydrogen or sulfo, U is —CN, —CONH$_2$, SO$_3$H, —OH or OSO$_3$H, D is a phenyl or naphthyl radical which can be substituted by C$_1$-C$_4$alkyl, C$_1$-C$_4$alkoxy, halogen, carboxyl and sulfo and which contains at least one reactive radical bound directly or via a bridge member to a ring carbon atom, or to which a further radical is bound which contains a reactive radical, and u is the number 2, 3, 4 or 5.

Examples of suitable C$_1$-C$_4$alkyl substituents on the phenyl or naphthyl radical D are methyl, ethyl, n-propyl, isopropyl, n-butyl, sec.-butyl, isobutyl and tert-butyl; the alkyl radical can be further substituted, for example by halogen, such as fluorine, chlorine or bromine, hydroxyl, cyano, C$_1$-C$_4$alkoxy, such as methoxy or ethoxy, C$_1$-C$_4$alkoxycarbonyl, such as methoxycarbonyl, carboxyl, sulfamoyl, sulfo or sulfato. A preferred alkyl substituent on the phenyl radical D is methyl.

Examples of suitable halogen substituents on the phenyl or naphthyl radical D are fluorine, chlorine and bromine.

Examples of suitable C$_1$-C$_4$alkoxy substituents on the phenyl or naphthyl radical D are methoxy, ethoxy, n-propoxy, isopropoxy and n-butoxy; the alkoxy radical can be further substituted, for example by C$_1$-C$_4$alkoxy, such as methoxy and ethoxy; one example is the ethoxyethoxy radical. A preferred alkoxy radical of the phenyl radical D is methoxy.

Fibre reactive radicals as substituent(s) of the phenyl or naphthyl radical D are understood to mean those which are capable of reacting with the hydroxyl groups of cellulose, the amino, carboxyl, hydroxyl and thiol groups of wool and silk, or with the amino and, if appropriate, carboxyl groups of synthetic polyamides with the formation of covalent chemical bonds.

They are preferably fibre-reactive radicals of the aliphatic, aromatic or heterocyclic series which are bound directly or via a bridge member to the radical D, or a further radical which has at least one aliphatic, aromatic or heterocyclic reactive group is bound to the radical D.

Examples of suitable fibre-reactive radicals are those which contain at least one detachable substituent bound to a heterocyclic, aromatic or aliphatic radical.

Examples of suitable fibre-reactive radicals are the following aliphatic and aromatic radicals:

Vinylsulfonyl, β-chloroethylsulfonyl, β-sulfatoethylsulfonyl, β-acetoxyethylsulfonyl, phosphatoethylsulfonyl, β-thiosulfatoethylsulfonyl, N-methyl-N-(β-sulfatoethylsulfonyl)amino, acryloyl, mono-, di- or trichloroacryloyl such as —CO—CCl=CH$_2$, —CO—CH=CH—Cl, —CO—CCl=CH—CH$_3$; mono-, di- or tribromoacryloyl such as —CO—CBr=CH$_2$, —CO—CH=CH—Br, —CO—CBr=CH—CH$_3$; and —CO—CCl=CH—COOH, —CO—CH=CCl—COOH, —CO—CBr=CH—COOH, —CO—CH=CBr—COOH; —CO—CCl=CCl—COOH, —CO—CBr=CBr—COOH; precursors of acryloyl radicals and derivatives of acryloyl radicals such as β-chloro- or β-bromopropionyl, 3-phenylsulfonylpropionyl, 3-methylsulfonylpropionyl, 2-chloro-3-phenylsulfonylpropionyl, 2,3-dichloropropionyl, 2,3-dibromopropionyl; and 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluorocyclobutyl-1)-acryloyl, an α- or β-alkenyl- or arylsulfonyl acryloyl group such as α- or β-methylsulfonylacryloyl, propioloyl, chloroacetyl, bromoacetyl, 4-(β-chloroethylsulfonyl)butyryl, 4-vinylsulfonylbutyryl, 5-(β-chloroethylsulfonyl)valeryl, 5-vinylsulfonylvaleryl, 6-(β-chloroethylsulfonyl)caproyl, 6-vinylsulfonylcaproyl; and 4-fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl.

Further suitable fibre-reactive radicals are those of the heterocyclic series, for example 2,4-dichloro-6-triazinyl, mono-, di- or trihalogenopyrimidinyl radicals, such as 2,4-dichloro-6-pyrimidinyl, 2,4,5-trichloro-6-pyrimidinyl, 2,4-dichloro-5-nitro- or -5-methyl- or -5-carboxymethyl- or 5-carboxy- or -5-cyano- or -5-vinyl- or -5-sulfo- or -5-mono-, -di- or -trichloromethyl- or -5-methylsulfonyl-6-pyrimidinyl, 2,5-dichloro-4-methylsulfonyl-6-pyrimidinyl, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-trifluoromethyl-4-pyrimidinyl, 2-fluoro-6-carboxamido-4-pyrimidinyl, 2-fluoro-6-carbomethoxy-4-pyrimidinyl, 2-fluoro- 6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; 2,4-Bis-methylsulfonyl-4-pyrimidinyl, 2,5-Bis-methylsulfonyl-5-chloro-4-pyrimidinyl, 2-methylsulfonyl-4-pyrimidinyl, 2-phenylsulfonyl-4-pyrimidinyl, 2-methylsulfonyl-5-chloro-6-methyl-4-pyrimidinyl, 2-methylsulfonyl-5-bromo-6-methyl-4-pyrimidinyl, 2-methylsulfonyl-5-chloro-6-ethyl-4-pyrimidinyl, 2-methylsulfonyl-5-nitro-6-methyl-4-pyrimidinyl, 2,5,6-tris-methylsulfonyl-4-pyrimidinyl, 2-methylsulfonyl-5,6-dimethyl-4-pyrimidinyl, 2-ethylsulfonyl-5-chloro-6-methyl-4-pyrimidinyl, 2-methylsulfonyl-6-chloro-4-pyrimidinyl, 2,6-bis-methylsulfonyl-5-chloro-4-pyrimidinyl, 2-methylsulfonyl-6-carboxy-4-pyrimidinyl, 2-methylsulfonyl-5-sulfo-4-pyrimidinyl, 2-methylsulfonyl-6-carbomethoxy-4-pyrimidinyl, 2-methylsulfonyl-5-carboxy-4-pyrimidinyl, 2-methylsulfonyl-5-cyano-6-methoxy-4-pyrimidinyl, 2-methylsulfonyl-5-chloro-4-pyrimidinyl, 2-sulfoethylsulfonyl-6-methyl-4-pyrimidinyl, 2-methylsulfonyl-5-bromo-4-pyrimidinyl, 2-phenylsulfonyl-5-chloro-4-pyrimidinyl, 2-carboxymethylsulfonyl-5-chloro-6-methyl-4-pyrimidinyl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 2,4,6-trichloropyrimidine-5-carbonyl, 2,4-dichloro-6-methyl-pyrimidine-5-carbonyl or -5-sulfonfyl, 2-methylsulfonyl-6-chloropyrimidine-4- and -5-carbonyl, 2,6-bis-(methylsulfonyl)-4-pyrimidine or -5-carbonyl, 2-ethylsulfonyl-6-chloropyrimidine-5-carbonyl, 2,4-bis-(methylsulfonyl)-pyrimidine-5-sulfonyl, 2-methylsulfonyl-4-chloro-6-methylpyrimidine-5-sulfonyl or -5-carbonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-5- or -6-carbonyl, 2,3-dichloroquinoxaline-5- or -6-sulfonyl, 1,4-dichloroquinazolinephthalazine-6-sulfonyl- or -6-carbonyl, 2,4-dichloroquinazoline-7- or -6-sulfonyl or -carbonyl, 2,4,6-trichloroquinazoline-7- or -8-sulfonyl, 2- or 3- or 4-(4',5'-dichloro-6'-pyridazon-1'-yl)-phenylsulfonyl or -carbonyl, β-(4',5'-dichloro-6'-pyridazinon-1'-yl)-propionyl, 3,6-dichloropyridazine-4-carbonyl or -4-sulfonyl, 2-chlorobenzothiazole-5- or -6-carbonyl or -5- or -5- or -6-sulfonyl, 2-arylsulfonyl- or 2-alkylsulfonylbenzothiazole-5- or -6-carbonyl or -5- or -6-sulfonyl, 2-methylsulfonyl- or 2-ethylsulfonylbenzothiazole-5- or -6-sulfonyl- or -carbonyl, 2-phenylsulfonyl-benzothiazole-5- or -6-sulfonyl or -carbonyl and the corresponding 2-sulfonylbenzothiazole-5- or -6-carbonyl or -sulfonyl derivatives which contain sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -5-sulfonyl; triazine rings which can contain ammonium groups, such as 2-trimethylammonium-4-phenylamino- or -4-(o, m- or p-sulfophenyl)amino-6-triazinyl, 2-(1,1-dimethylhydrazinium)-4-phenylamino- or -4-(o-, m- or p-sulfophenyl)amino-6-triazinyl, 2-(2-isopropylidene-1,1-dimethyl)hydrazinium-4-phenylamino- or -4-(o-, m- or p-sulfophenyl)amino-6-triazinyl, 2-N-aminopyrrolidinium- or 2-N-aminopiperidinium-4-phenylamino- or -4-(o-, m- or p-sulfophenyl)amino-6-triazinyl, furthermore 4-phenylamino- or 4-(sulfophenylamino)-6-triazinyl radicals which contain in the 2-position, 1,4-bisazabicyclo[2.2.2.]octane or 1,2-bisazabicyclo[0.3.3.]octane bound to it via a quarternary nitrogen bond, 2-pyridinium-4-phenylamino- or -4-(o, m- or p-sulfophenyl)amino-6-triazinyl and the corresponding 2-onium-6-triazinyl radicals which are substituted in the 4-position by alkylamino such as methylamino, ethylamino or β-hydroxyethylamino, or alkoxy such as methoxy or ethoxy or aryloxy such as phenoxy, or by sulfophenoxy groups.

Further interesting fibre-reactive radicals are fluoro- or chloro-1,3,5-triazine radicals of the formula

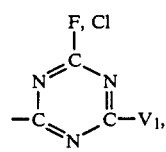

in which suitable substituents $V_1$ on the triazine ring include in particular: —$NH_2$, alkylamino, N,N-dialkylamino, cycloalkylamino, N,N-dicycloalkylamino, aralkylamino, arylamino group, mixed substituted amino groups, such as N-alkyl-N-cyclohexylamino and N-alkyl-N-arylamino groups, further amino groups which contain heterocyclic radicals, which can have further fused-on carbocyclic rings, and amino groups in which the amino nitrogen atom is part of an N-heterocyclic ring, which can contain further hetero atoms, and hydrazino and semicarbazido. The abovementioned alkyl radicals can be straight-chain or branched, or low molecular weight or high molecular weight, alkyl radicals having 1 to 6 carbon atoms being preferred; suitable cycloalkyl, aralkyl and aryl radicals are in particular cyclohexyl, benzyl, phenethyl, phenyl and naphthyl radicals; heterocyclic radicals are in particular furan, thiophene, pyrazole, pyridine, pyrimidine, quinoline, benzimidazole, benzothiazole and benzoxazole radicals; and suitable amino groups in which the amino nitrogen atom is part of an N-heterocyclic ring are preferably radicals of six-membered N-heterocyclic compounds, which can contain nitrogen, oxygen or sulfur as further hetero atoms. The abovementioned alkyl, cycloalkyl, aralkyl and aryl radicals, the heterocyclic radicals and the N-heterocyclic rings can be further substituted, for example by: halogen, such as fluorine, chlorine and bromine, nitro, cyano, trifluoromethyl, sulfamoyl, carbamoyl, $C_1$–$C_4$alkyl, $C_1$–$C_4$alkoxy, acylamino groups, such as acetylamino or benzoylamino, ureido, hydroxyl, carboxyl, sulfomethyl or sulfo. Examples of this type of amino groups are: —$NH_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfo-1-naphthylamino, 3,6-disulfo-1-naphthylamino, 3,6,8-trisulfo-1-naphthylamino, 4,6,8-trisulfo-1-naphthylamino, 1-sulfo-2-naphthylamino, 1,5-disulfo-2-naphthylamino, 6-sulfo-2-naphthylamino, morpholino, piperidino, piperazino, hydrazino and semicarbazido.

The halogenotriazinyl radicals can also be connected to a second halogenotriazinyl radical or halogenopyrimidinyl radical. Examples of these radicals are as follows:

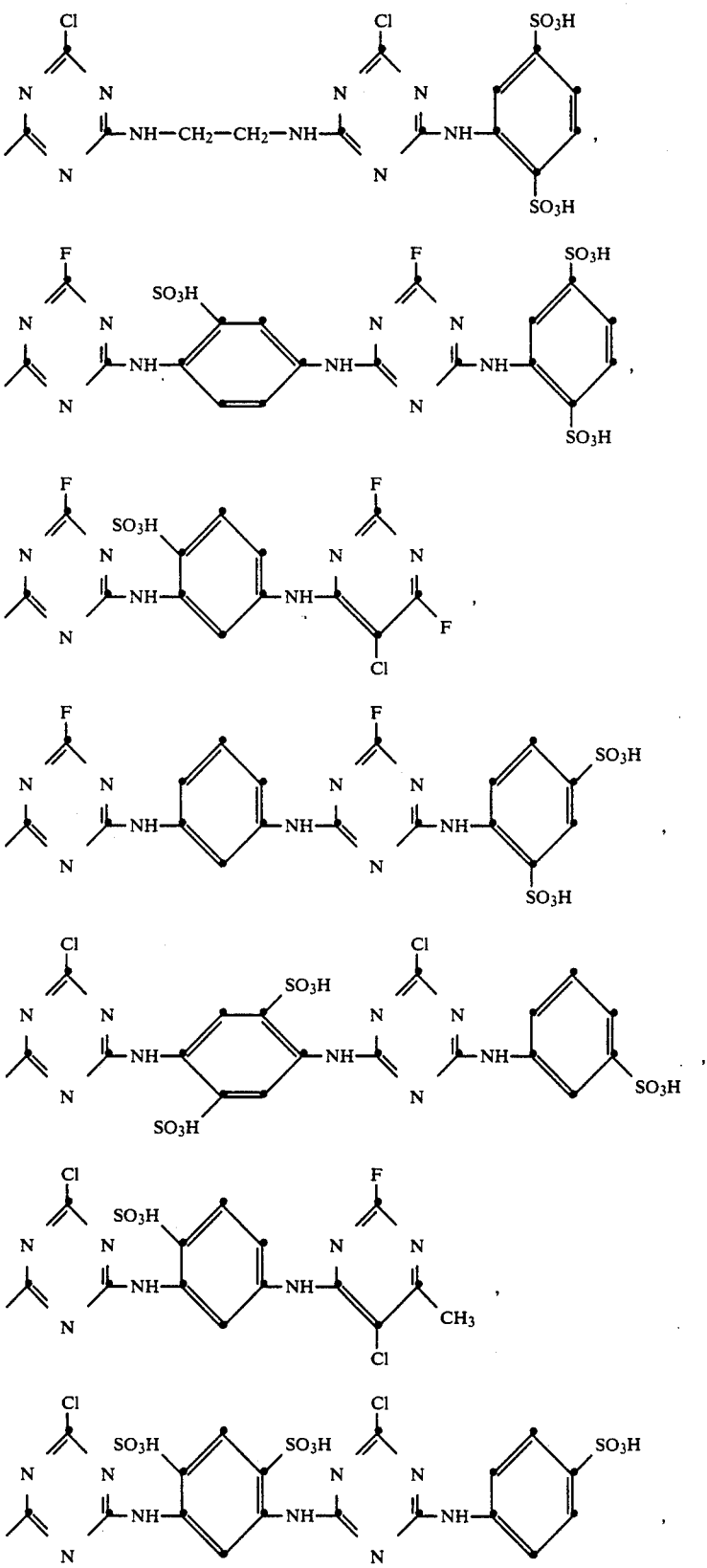

-continued

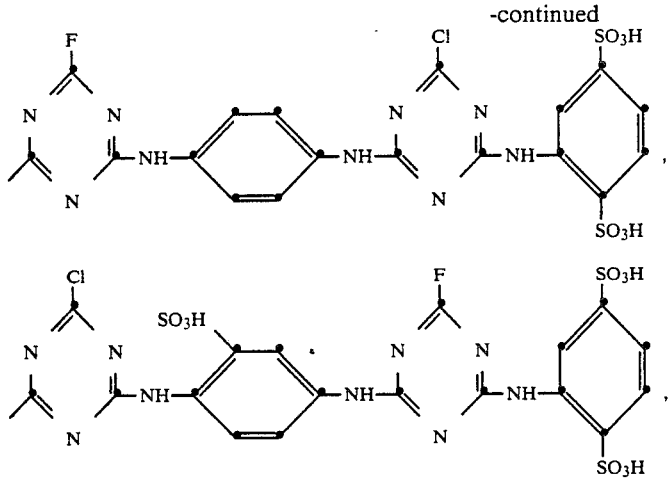

Moreover, the reactive halogen atoms in the abovementioned 4-substituted 2-halogenotriazinyl radicals can also be exchanged for tertiary bases such as trimethylamine, triethylamine, dimethyl-$\beta$-hydroxyethylamine, triethanolamine, N,N-dimethylhydrazine, pyridine, $\alpha$-, $\gamma$-picoline, nicotinic acid or isonicotinic acid with the formation of quarternary salts.

The halogenotriazinyl radicals can also be connected via a bridge member with reactive radicals other than halogenotriazinyl radicals. Examples of these radicals are as follows:

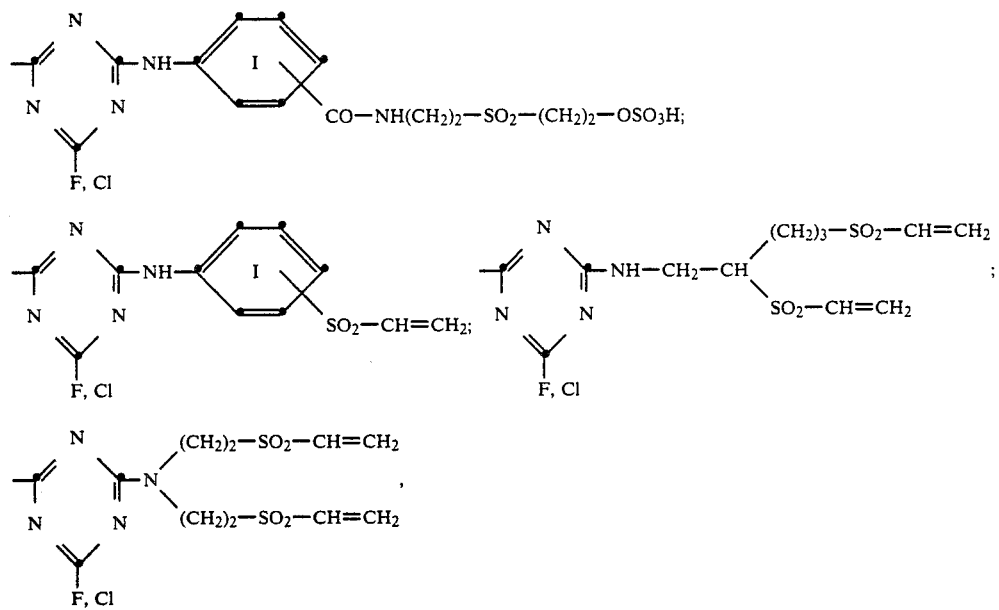

in which phenyl ring I can be substituted by $C_1$-$C_4$alkyl, $C_1$-$C_4$alkoxy, halogen, carboxyl and in particular sulfo. The reactive dyes of the formula (1) then contain at least 2 or 3 fibre-reactive radicals.

A large number of radicals are suitable as bridge member between the phenyl or naphthyl radical D and the fibre-reactive radical or as bridge member between two fibre-reactive radicals. The bridge member is, for example, an aliphatic, aromatic or heterocyclic radical; furthermore, the bridge member can also be composed of various radicals of this type. As a rule, the bridge member contains at least one functional group, for example a carbonyl or amino group, and is bound to the ring carbon atom of the phenyl or naphthyl radical D via the functional group, for example the carbonyl or amino group or —$CH_2$—NH— group, or to an oxygen atom. A suitable aliphatic radical is, for example, an alkylene radical having 1 to 7 carbon atoms or branched isomers thereof. The C chain of the alkylene radical can be interrupted by a hetero atom, for example an oxygen atom. A suitable aromatic radical is, for example, a phenyl radical, which can be substituted by $C_1$-$C_4$alkyl, for example methyl or ethyl, $C_1$-$C_4$alkoxy, for example methoxy or ethoxy, halogen, for example chlorine, carboxyl or sulfo, and a suitable heterocyclic radical is, for example, a piperazine radical. Examples of these bridge members are the following radicals:

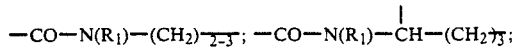

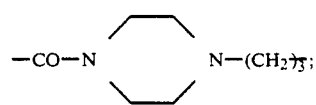

-continued $-CO-N(R_1)-(CH_2)_2-O-(CH_2)_2-;$

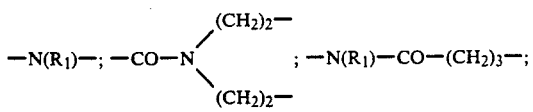

$-N(R_1)-(CH_2)_2-O-(CH_2)_2-;\ -O-(CH_2)_2-;$

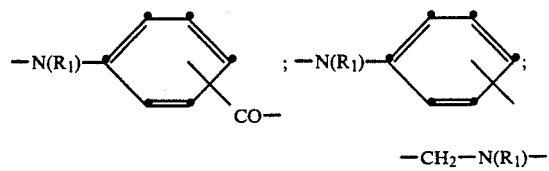

$-CH_2-N(R_1)-.$

A further suitable radical which is bound via a bridge member to the phenyl or naphthyl radical D and contains at least one reactive group is, for example, a non-fibre-reactive s-trizinyl radical which contains at least one fibre-reactive radical via a bridge member. Examples of these non-fibre-reactive triazinyl radicals which contain at least one reactive radical are:

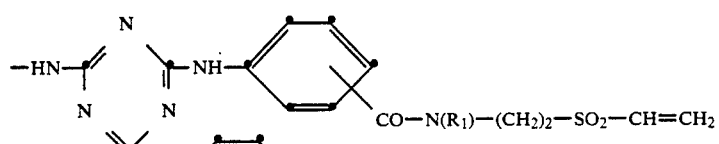

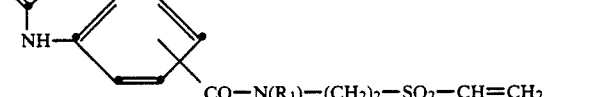

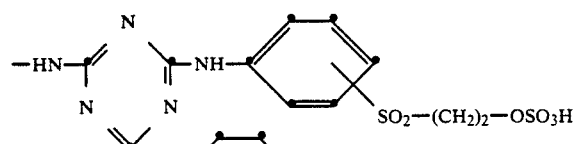

In the abovementioned formula, $R_1$ is hydrogen or $C_1$-$C_4$alkyl, which can be substituted by halogen, hydroxyl, cyano, $C_1$-$C_4$alkoxy, $C_1$-$C_4$alkoxycarbonyl, carboxyl, sulfamoyl, sulfo or sulfato.

Reactive dyes of the formula (1) in which U is —CH, —CONH$_2$, —SO$_3$H or —OSO$_3$H are preferred; preferably, U is —CONH$_2$ and in particular —CN.

Reactive dyes of the formula

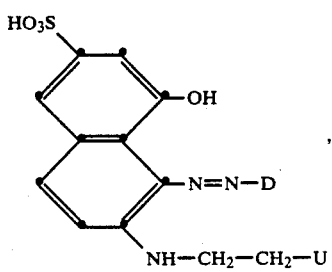

(2)

in which U is —CN or —CONH$_2$ and D is as defined in formula (1) are particularly preferred.

Reactive dyes of the formula (1) and in particular those of the formula (2) in which D is a radical of the formula

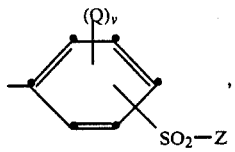

(3a)

or

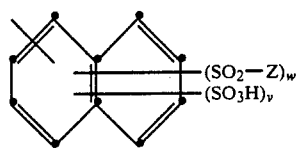

(3b)

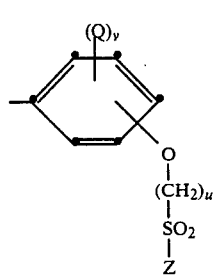

(3c)

in which Q is $C_1$-$C_4$alkyl, $C_1$-$C_4$alkoxy, halogen, carboxyl or sulfo, v is the number 0, 1 or 2 and w is the number 1 or 2 and u is as defined in formula (1) and z is β-sulfatoethyl, β-thiosulfatoethyl, β-phosphatoethyl, β-acyloxyethyl, β-halogenoethyl or vinyl are very particularly preferred.

Examples of suitable substituents Q in the radical D are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, halogen atoms, such as fluorine, chlorine or bromine.

Preferably, Q is methyl, methoxy and sulfo.

The substituent Q as sulfo in formulae (3a) and (3c) and the —SO$_3$H group in formula (3b) is bound preferably in the ortho position relative to the azo group.

Z as β-halogenoethyl in formula (3a), (3b) or (3c) is in particular a β-chloroethyl and as β-acyloxyethyl in particular a β-acetoxyethyl radical.

The reactive dyes of the formula (1) and in particular those of the formula (2) in which D is a radical of the formula

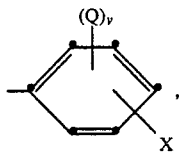 (4a)

or

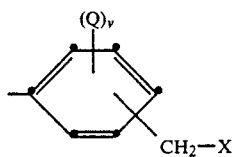 (4b)

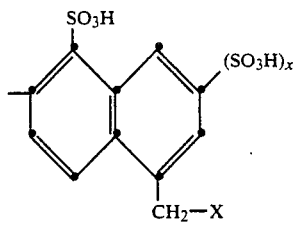 (4c)

and X is a radical of the formula

—NHCOCBr=CH$_2$ (5a),

—NHCOCHBrCH$_2$Br (5b),

—NHCO—(CH$_2$)$_3$SO$_2$—Z (5c) or

—N(R$_{11}$)—SO$_2$—Z (5d),

Q, Z and v are as defined in formula (3a), (3b) or (3c), x is the number 0 or 1 and R$_{11}$ is hydrogen, methyl or ethyl are also very particularly preferred.

In formulae (4a) and (4b), Q as sulfo group is bound preferably in the ortho position relative to the azo group.

Furthermore reactive dyes of the formula (1) and in particular those of the formula (2) in which D is a radical of the formula

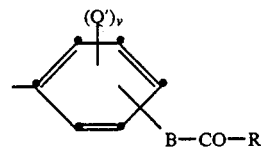 (6)

Q' is C$_1$-C$_4$alkyl, C$_1$-C$_4$alkoxy, halogen, carboxyl, sulfo or —SO$_2$—Z in which Z is as defined in formula (3a), (3b) or (3c), v is the number 0, 1 or 2, B is a direct bond or a radical —(CH$_2$)—$_n$ or —O—(CH$_2$)—$_n$; n is 1, 2, 3, 4, 5 or 6; R is a radical of the formula

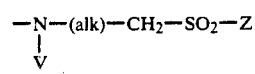 (7a)

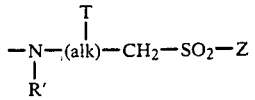 (7b)

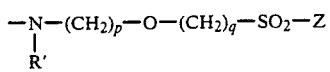 (7c)

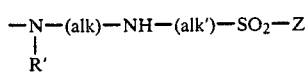 (7d)

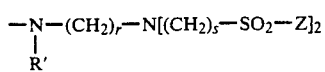 (7e)

or

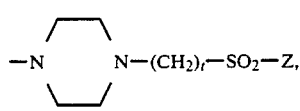 (7f)

in which R' is hydrogen or C$_1$-C$_4$alkyl, alk is an alkylene radical having 1 to 7 carbon atoms or branched isomers thereof, T is hydrogen, halogen, hydroxyl, sulfato, carboxyl, cyano, C$_1$-C$_4$alkanoyloxy, C$_1$-C$_4$alkoxycarbonyl, carbamoyl or a radical —SO$_2$—Z, V is hydrogen, substituted or unsubstituted C$_1$-C$_4$alkyl or a radical of the formula

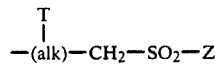

in which (alk) is as defined above, alk', independently of one another, are polymethylene radicals having 2 to 6 C atoms or branched isomers thereof, Z is as defined in formula (3a), (3b) or (3c), p, q, r and t, independently of one another, are each the number 1, 2, 3, 4, 5 or 6 and s is 2, 3, 4, 5 or 6 are very particularly preferred.

The same radicals mentioned in formula (3a), (3b) or (3c) for Q are suitable for Q' as C$_1$-C$_4$alkyl, C$_1$-C$_4$alkoxy and halogen.

The radical B contains 1 to 6, preferably 1 to 4, carbon atoms; Examples of B are: methylene, ethylene, propylene, butylene, methylenoxy, ethylenoxy, propylenoxy and butylenoxy. If B is a radical —O—(CH$_2$—)$_n$, B is bound to the benzene ring via the oxygen atom. Preferably, B is a direct bond.

The alkylene radical alk is preferably methylene, ethylene, methylmethylene, propylene or butylene, The substituent T as alkanoyloxy radical is in particular acetyloxy, propionyloxy or butyryloxy and as alkoxycarbonyl radical in particular methoxycarbonyl, ethoxycarbonyl or propyloxycarbonyl. An alkyl radical V can be methyl, ethyl, propyl, isopropyl, butyl, isobutyl, sec-butyl or tert-butyl. Derivatives of the carboxyl or sulfo group are, for example, carbamoyl, N-methyl-, N-ethyl, N,N-dimethyl- and N,N-diethylcarbamoyl, cyano, acetyl, propionyl, butyryl, methoxycarbonyl, ethoxycarbonyl, propyloxycarbonyl, sulfamoyl, N-methyl-, N-ethyl-, N,N-dimethyl and N,N-diethylsulfamoyl, methylsulfonyl, ethylsulfonyl and propylsulfonyl. The polymethylene radicals alk' are preferably ethylene, propylene or butylene. The indices p, q and t are independent of one another and preferably 2, 3 or 4. The indices r and s, independently of one another, are preferably 2.

Where T is a radical —SO₂—Z and R' is hydrogen, the radical of the formula (7b) preferably has the form

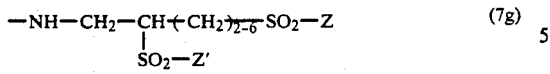   (7g)

in which Z and Z', independently of one another, are β-sulfatoethyl, β-thiosulfatoethyl, β-phosphatoethyl, β-acyloxyethyl, β-halogenoethyl or vinyl. An important formula variation of this radical is:

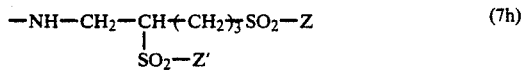   (7h)

in which Z is Z', Z and Z' being as defined above; Z or Z' is in particular β-sulfatoethyl, β-chloroethyl or vinyl.

Reactive dyes of the formula (1) and in particular those of the formula (2) in which D is a radical of the formula

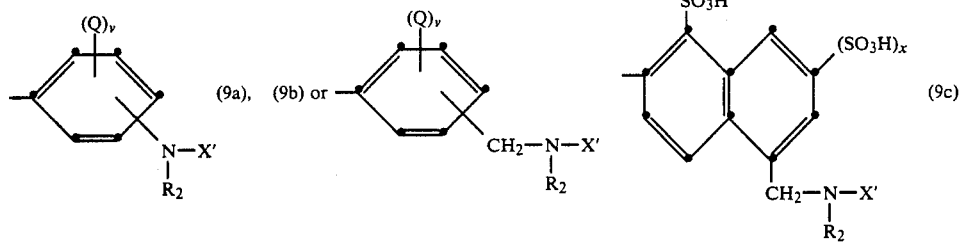

in which Q is as defined in formula (3a), (3b) or (3c), R₂ is hydrogen, methyl or ethyl, X' is a triazine or pyrimidine reactive radical, v is the number 0, 1 or 2 and x is the number 0 or 1 are also very particularly preferred. Where X' is a triazine reactive radical, U in formula (1) or (2) is preferably CN. A sulfo group Q in formulae (9a) and (9b) is preferably bound in the ortho position relative to the azo group.

Of the reactive dyes of the formula (1) and (2) in which D is a radical of the formula (6), the reactive dyes in which D is a radical of the formula

   (8)

Q' is hydrogen or sulfo, B is a direct bond or a radical —CH₂— or —O—CH₂CH₂—, R is a radical of the formula (7a), (7b), (7c) or (7f), Z is β-sulfatoethyl, β-chloroethyl or vinyl, alk is methylene or ethylene, T is hydrogen and V is hydrogen or a radical of the formula

in which alk, T and Z are as defined or alk is a radical of the formula

T' is a radical —SO₂Z in which Z is as defined above, and V is hydrogen, R' is hydrogen, p is the number 2, q is the number 2 and t is the number 3 are particularly important.

Of particular importance are furthermore the reactive dyes of the formula (1) and in particular those of the formula (2) in which D is a radical of the formula (9a), (9b) or (9c) and X' is 2,4,5-trichloro-6-pyrimidinyl or 2,4-difluoro-5-chloro-6-pyrimidinyl or a radical of the formula

   (10)

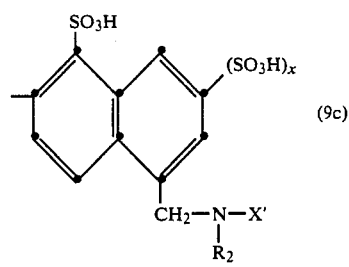

in which X₁ is fluorine, chlorine, bromine, sulfo, C₁-C₄alkylsulfonyl, phenylsulfonyl or carboxypyridinium, and X₂ is —OH, a substituted or unsubstituted alkoxy group, —SH, a substituted or unsubstituted alkylthio or arylthio group, —NH₂ or the radical of an aliphatic, aromatic or heterocyclic amine, or X' is a radical of the formula

   (12)

in which X₄ is fluorine, chlorine, bromine, sulfo, C₁-C₄alkylsulfonyl, phenylsulfonyl, carboxypyridinium, —NH₂ or the radical of an aliphatic, aromatic or heterocyclic amine, or has the same meaning as X₅ independently thereof, and X₅ is a radical of the formula

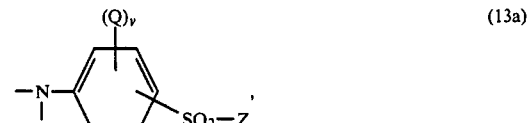   (13a)

-continued

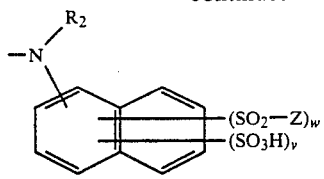
(13b)

or

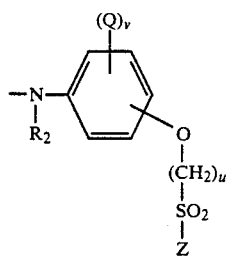
(13c)

in which Q and v are as defined in formula (3a), (3b) or (3c), and w is the number 1 or 2 and u is the number 2, 3, 4 or 5, Z is β-sulfatoethyl, β-thiosulfatoethyl, β-phosphatoethyl, β-acyloxyethyl, β-halogenoethyl or vinyl, and $R_2$ is hydrogen, methyl or ethyl, or X' is a radical of the formula

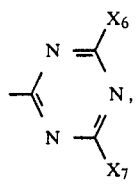
(14)

in which $X_6$ is fluorine, chlorine, bromine, sulfo, $C_1$-$C_4$alkylsulfonyl, phenylsulfonyl, carboxypyridinium, —$NH_2$ or the radical of an aliphatic, aromatic or heterocyclic amine, or has the same meaning as $X_7$ independently thereof, and $X_7$ is a radical of the formula

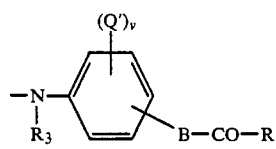
(15)

in which Q' and v are as defined in formula (6), $R_3$ is hydrogen or $C_1$-$C_4$alkyl which can be substituted by halogen, hydroxyl, cyano, $C_1$-$C_4$alkoxy, $C_1$-$C_4$alkoxycarbonyl, carboxyl, sulfamoyl, sulfo or sulfato, B is a direct bond or a radical —(CH$_2$)—$_n$ or —O—(CH$_2$)—$_n$; n is 1, 2 3, 4, 5 or 6; R is a radical of the formula —N—(alk)—CH$_2$—SO$_2$—Z       (7a)
  |
  V T
   |
—N—(alk)—CH$_2$—SO$_2$—Z       (7b)
  |
  R'

—N—(CH$_2$)$_p$—O—(CH$_2$)$_q$—SO$_2$—Z       (7c)
  |
  R'

-continued

—N—(alk)—NH—(alk')—SO$_2$—Z       (7d)
  |
  R'

—N—(CH$_2$)$_r$—N[(CH$_2$)$_s$—SO$_2$—Z]$_2$       (7e)
  |
  R' or

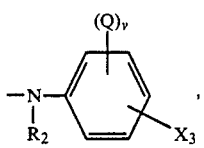
(7f)

in which R' is hydrogen or $C_1$-$C_6$alkyl, alk is an alkylene radical having 1 to 7 carbon atoms or branched isomers thereof, T is hydrogen, halogen, hydroxyl, sulfato, carboxyl or cyano, $C_1$-$C_4$alkanoyloxy, $C_1$-$C_4$alkoxycarbonyl, carbamoyl or a radical —SO$_2$—Z, V is hydrogen, substituted or unsubstituted $C_1$-$C_4$alkyl or a radical of the formula T
   |
—(alk)—CH$_2$—SO$_2$—Z in which (alk) is as defined above, alk', independently of one another, are polymethylene radicals having 2 to 6 C atoms or branched isomers thereof, Z is β-sulfatoethyl, β-thiosulfatoethyl, β-phosphatoethyl, β-acyloxyethyl, β-halogenoethyl or vinyl, p, q, r and t, independently of one another, are each the number 1, 2, 3, 4, 5 or 6 and s is 2, 3, 4, 5, or 6, or $X_7$ is a radical of the formula (7a), (7b), (7c), (7d), (7e) or (7f) which is bound directly to the triazine ring and in which Z, alk, T, V, R', alk', p, q, r, s and t are as defined above.

Of very particular importance are the reactive dyes in which in formula (10) $X_1$ is fluorine or chlorine and $X_2$ is $C_1$-$C_4$alkoxy, $C_1$-$C_4$alkoxy-$C_1$-$C_4$alkoxy; —$NH_2$, $C_1$-$C_4$alkylamino, N,N-di-$C_1$-$C_4$alkylamino, phenylamino, N-$C_1$-$C_4$alkyl-N-phenylamino or naphthylamino, in which the alkyl radicals can be substituted by $C_1$-$C_4$alkoxy, cyano, halogen, hydroxyl, sulfo or sulfato, and the phenyl or naphthyl radical can be substituted by $C_1$-$C_4$alkyl, $C_1$-$C_4$alkoxy, halogen, carboxyl or sulfo; or is morpholino; or $X_1$ is fluorine or chlorine, and $X_2$ is a radical of the formula

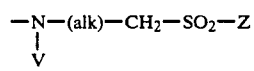
(11)

in which $R_2$ is hydrogen, methyl or ethyl, Q is $C_1$-$C_4$alkyl, $C_1$-$C_4$alkoxy, halogen, carboxyl or sulfo, and v is the number 0, 1 or 2 and $X_3$ is a radical of the formula —NHCOCBr=CH$_2$       (5a), —NHCOCHBr—CH$_2$Br       (5b), —NHCO—(CH$_2$)$_3$—SO$_2$—Z or       (5c)

—N(R$_1$)—SO$_2$—Z       (5d), $R_1$ is hydrogen, methyl or ethyl, and Z is β-sulfatoethyl, β-thiosulfatoethyl, β-phosphatoethyl, β-acyloxyethyl, β-halogenoethyl or vinyl.

Of very particular importance are furthermore the reactive dyes in which in formula (14) $X_6$ is fluorine, chlorine, —$NH_2$, $C_1$-$C_4$alkylamino, N,N-di-$C_1$-$C_4$alkylamino, phenylamino, N-$C_1$-$C_4$alkyl-N-phenylamino or naphthylamino, in which the alkyl radicals can be substituted by $C_1$-$C_4$alkoxy, cyano, halogen, hydroxyl, sulfo or sulfato, and the phenyl or naphthyl radical can be substituted by $C_1$-$C_4$alkyl, $C_1$-$C_4$alkoxy, halogen, carboxyl or sulfo, or is morpholino or a radical of the formula

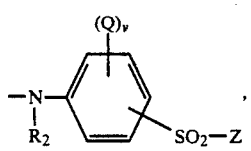
(13a)

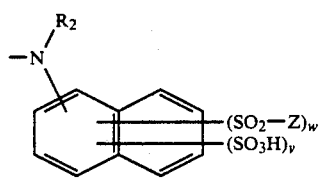
(13b)

or

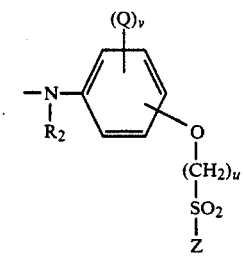
(13c)

in which Q is $C_1$-$C_4$alkyl, $C_1$-$C_4$alkoxy, halogen, carboxyl or sulfo, v is the number 0, 1 or 2 and w is the number 1 or 2 and u is the number 2, 3, 4 or 5, Z is as defined in formula (7a), and $R_2$ is hydrogen, methyl or ethyl, and/or in which $X_7$ is a radical of the formula (7a), (7b), (7c) or (7f), Z is β-sulfatoethyl, β-chloroethyl or vinyl, alk is methylene or ethylene, T is hydrogen and V is hydrogen or a radical of the formula

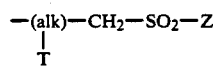

in which alk is a radical

T is a radical —$SO_2Z$ in which Z is as defined above, V is hydrogen, R' is hydrogen, p and q are each the number 2 and t is the number 3, or in which $X_7$ is a radical of the formula

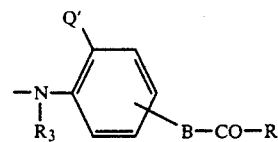
(16)

in which $R_3$ is hydrogen or $C_1$-$C_4$alkyl, which can be substituted by halogen, hydroxyl, cyano, $C_1$-$C_4$alkoxy, $C_1$-$C_4$alkoxycarbonyl, carboxyl, sulfamoyl, sulfo or sulfato, B is a direct bond or a radical —$CH_2$— or —O—$CH_2CH_2$—, R is a radical of the formula (7a), (7b), (7c) or (7f), Z is β-sulfatoethyl, β-chloroethyl or vinyl, alk is methylene or ethylene, T is hydrogen and V is hydrogen or a radical of the formula

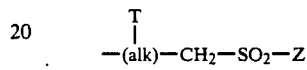

in which alk, T and Z are as defined above, or alk is a radical

T' is a radical —$SO_2Z$ in which Z is as defined above, and V is hydrogen, R' is hydrogen, p is the number 2, m is the number 2 and q is the number 3, or $X_7$ is a radical of the formula

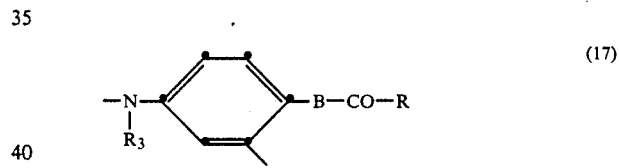
(17)

in which $R_3$ is hydrogen, methyl or ethyl, B is a direct bond or a radical —$CH_2$— or —O—$CH_2CH_2$—, R is a radical of the formula (7a), (7b), (7c) or (7f), Z is β-sulfatoethyl, β-chloroethyl or vinyl, alk is methylene or ethylene, T is hydrogen and V is hydrogen or a radical of the formula

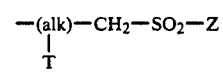

in which alk, T and Z are as defined above, or alk is a radical

T is a radical —$SO_2$—Z in which Z is as defined above and V is hydrogen, R' is hydrogen, p and q are each the number 2 and t is the number 3.

$R_3$ in formula (16) is in particular hydrogen, methyl or ethyl.

The most interesting dyes are those of the formulae

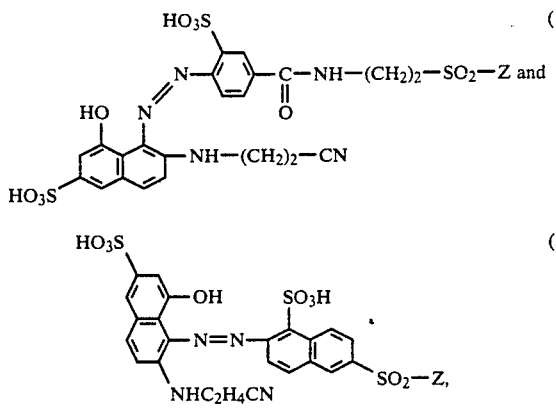

in which Z is β-sulfatoethyl, β-chloroethyl or vinyl; and

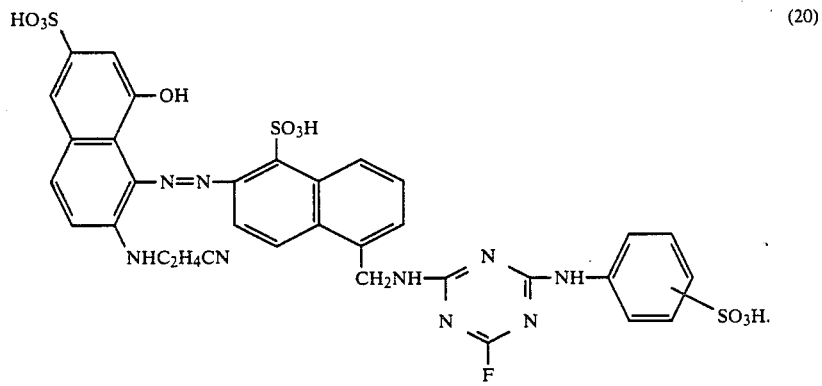

The invention further relates to a process for the preparation of reactive dyes of the formula (1), which comprises introducing at least one reactive radical into a suitable dye in which D does not contain any reactive radical or into a dye precursor which contains the radical D or, in the case where dye precursors are used, converting the intermediates obtained into the desired final dyes and, if desired, subsequently carrying out a further conversion reaction.

One embodiment of the process according to the invention comprises diazotizing an amine of the formula $$D'-NH_2 \qquad (21)$$

in which D' has the meaning given for D in formula (1) or is a phenyl or naphthyl radical D which is free of reactive radicals and coupling the product onto a coupling component of the formula

in which u, U and Y are as defined in formula (1), and if D' is free of reactive radicals, introducing at least one reactive radical into D' and, if desired, subsequently carrying out a further conversion reaction.

The diazotization of the diazo component of the formula (21) is usually carried out by reaction with nitrous acid in aqueous/mineral acid solution at low temperature and the coupling onto the coupling component of the formula (22) at acidic, neutral to weakly alkaline pH values.

If desired, following the process according to the invention, a further conversion reaction is carried out. The reactions by which the final dyes are prepared from precursors are coupling reactions which lead to azo dyes.

Since the individual abovementioned process steps can be carried out in a different order, different embodiments are possible. In general, the reaction is carried out in successive steps, in which the order of the simple reactions between the individual reactants advantageously depends on the specific conditions.

Which of the possible process variations give the best results or under which specific conditions, for example at which condensation temperature, it is most advantageous to carry out the reaction depends on the structure of the starting materials.

Since under certain conditions hydrolysis, for example of a halogenotriazine radical, takes place, an intermediate which contains acetylamino groups has to be hydrolysed to cleave off the acetyl groups, before it is condensed with a halogenotriazine. Which reaction is advantageously carried out first, differs from case to case and depends in particular on the solubility of the amino compounds involved and the basicity of the amino groups to be acylated.

A modulated embodiment of the process consists in first preparing a dye which contains a precursor of the reactive radical and converting this precursor afterwards into the final product, for example by esterification or an addition reaction. For example, a dye which contains the radical HO—CH$_2$CH$_2$— can be prepared and the intermediate can be reacted before or after acylation with sulfuric acid, whereby the hydroxyl group is converted to the sulfato group; or an analogous dye which contains the group H$_2$C=CH— is used and an adduct of the intermediate with thiosulfuric acid is formed, whereby a radical HO$_3$SS—CH$_2$CH$_2$— is formed. Sulfation of the hydroxyl group in a dye of the formula (1) or in a suitable precursor is carried out, for example, by reaction with concentrated sulfuric acid between 0° C. and a moderately higher temperature. The sulfation can also be carried out by reacting the hydroxyl compound with two equivalents of chlorosulfonic acid per hydroxyl group in a polar organic solvent, for example N-methylpyrrolidone, at 10° to 80° C. Preferably, the sulfation is carried out by stirring the compound in question into sulfuric acid monohydrate at temperatures between 5° and 15° C. The introduction of a different reactive radical into a compound of the formula (1) or an intermediate instead of a halogen atom or the sulfato group, for example a thiosulfato or phosphato group, is carried out in a manner known per se. The route by which an intermediate of the reactive radical is prepared leads in many cases to a uniform product and to complete conversion.

Moreover, elimination reactions can be carried out after the synthesis. For example, reactive dyes of the formula (1) which contain sulfatoethylsulfonyl radicals can be treated with reagents which eliminate hydrogen halide, such as sodium hydroxide, thus converting the sulfatoethylsulfonyl radicals into vinylsulfonyl radicals.

The introduction of at least one fibre-reactive radical into the diazo component of the formula (21) or into the dye of the formula (1) which is free of fibre-reactive groups is carried out in manner known per se; thus, for example, the condensation of a 2,4,6--trihalogeno-s-triazine or a pyrimidine with the organic dye of the formula (1) which is free of reactive radicals or the diazotizable component of the formula (21) which contains a group $-N(R_1)H$ is preferably carried out in aqueous solution or suspension, at low temperatures, preferably between 0° and 5° C., and at weakly acid, neutral to weakly alkaline pH. Advantageously, the hydrogen halide which is liberated during the condensation is continuously neutralized by the addition of aqueous alkali metal hydroxides, alkali metal carbonates or alkali metal bicarbonates. If it is desired to react the halogenotriazine dyes thus obtained further or to react the 2,4,6-trihalogeno-s-triazine with compounds which introduce the radical of the formula (11), (15), (16) or (17), the free amines or the salts, preferably in the form of the hydrochloride, are used. The reaction is carried out at temperatures between about 0° and 40° C., preferably between 5 and 25° C., with the addition of acid-binding agents, preferably sodium carbonate, in a pH range from 2 to 8, preferably 5 to 6.5.

The condensation of the halogenotriazine by means of a compound which introduces the radical of the formula (11), (15), (16) or (17) can be carried out before or after the condensation of the halogenotriazine with a dye of the formula (1) which is free of reactive radicals. The condensation of the halogenotriazine with a compound which introduces the radical of the formula (11), (15), (16) or (17) is preferably carried out in aqueous solution or suspension, at low temperature and at a weakly acid to neutral pH. In this case, too, the hydrogen halide which is liberated during the condensation is advantageously neutralized by the continuous addition of aqueous alkali metal hydroxides, alkali metal carbonates or alkali metal bicarbonates.

The compounds which introduce the radical of the formula (11), (15), (16) or (17) can be prepared by condensing, for example, the corresponding aminobenzoyl or aminonaphthoyl chlorides or the corresponding sulfochlorides with amines which correspond to the radicals of the formulae (7a) to (7f); or the starting material is a nitrobenzoyl or nitronaphthoyl chloride or naphthalenesulfochloride, which is condensed with the amine, followed by reduction of the nitro group to the amino group. According to a different described method, the acid chloride can be reacted with an unsaturated aliphatic amine, and 2-mercaptoethanol can be reacted with a double bond of the amide to form an adduct at temperatures between 50° and 180° C. by means of catalytic amounts of a free radical forming compound or sulfur. The hydroxyethylthio ether compounds thus obtained can also be prepared by condensing the acid chloride with a halogenoalkylamine, and heating the condensation product with 2-mercaptoethanol and sodium alcoholate in alcohol. The thio ether compounds are then additionally oxidized to the corresponding sulfones.

The oxidation of the thio ether compounds to the sulfones can be carried out by various methods, for example using hydrogen peroxide with or without the addition of tungsten or vanadium compounds as catalysts, furthermore using peracetic acid, potassium permanganate or chromic acid, or using chlorine/hydrochloric acid each in aqueous, aqueous-organic or organic medium.

The carboxamides or sulfonamides thus obtainable, in which the grouping $-SO_2-Z$ is a $\beta$-hydroxyethylsulfonyl group, can be converted to the corresponding products in which the grouping $SO_2-Z$ is the grouping $-SO_2-CH_2-CH_2-O-SO_3H$, $-SO_2-CH_2-CH_2-O-PO_3H_2$, $-SO_2-CH_2-CH_2$-halogen or $-SO_2-CH_2-CH_2O$-acyl by treatment with sulfating agents, phosphorylating agents, halogenating agents, alkyl- or arylsulfo halides, alkyl- or arylcarbonyl halides or alkyl- or arylcarboxylic anhydrides.

Suitable sulfating agents are, for example, concentrated sulfuric acid and chlorosulfonic acid and sulfamic acid or other compounds which release sulfur trioxide. Examples of suitable phosphorylating agents are concentrated phosphoric acid, pyro-, meta- or polyphosphoric acid, alkyl polyphosphates, phosphorus oxychloride or mixtures of phosphoric acid and phosphorus(V) oxide. Examples of halogenating agents which can be used are thionyl chloride or thionyl bromide.

One embodiment of the process according to the invention comprises introducing in a manner known per se one or two radicals of the formula

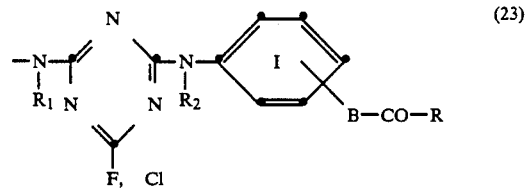

in which $R_1$, $R_2$, B and R are as defined above into a dye of the formula (1) which is free of fibre-reactive radicals or into a compound of the formula (21) which is free of fibre-reactive radicals or, in the case where dye precursors of the formula (21) are used, converting the intermediates obtained into the desired final dyes, and, if desired, subsequently carrying out a further conversion reaction.

The molar ratio of the starting materials must be selected in accordance with the composition of the final product, depending upon whether only one radical or two radicals of the formula (23) are supposed to be present in the reactive dye of the formula (1).

The introduction of a radical or two radicals of the formula (23) can also be carried out stepwise; thus, the reactive dyes of the formula (1) are obtained, for example, by reacting an organic dye of the formula (1) which is free of fibre-reactive groups or a dye precursor of the formula (21) which is free of fibre-reactive groups with at least one equivalent of an s-triazine of the formula

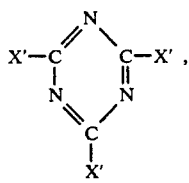 (24)

and with at least one equivalent of an amine of the formula

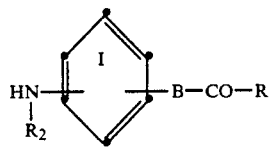 (25)

in any desired sequence to give a reactive dye of the formula (1), in which $R_1$, $R_2$, B and R are as defined above and the X', independently of one another, are a halogen atom; or, in the case where dye precursors are used, converting the intermediate obtained into the desired final dyes.

Since the individual abovementioned process steps can be carried out in a different order, in some cases even simultaneously, different embodiments are possible. In general the reaction is carried out in consecutive steps, the order of the simple reactions between the individual reactants advantageously depending on the specific conditions.

A preferred embodiment of the process according to the invention comprises using a coupling component of the formula

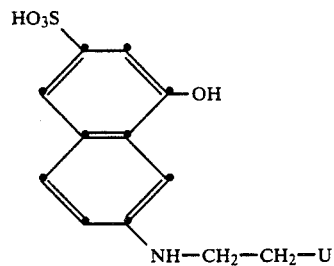 (26)

in which U is as defined in formula (2).

A particularly preferred embodiment of the process according to the invention comprises using a diazo component of the formula (21) in which D is as defined in formula (3a), (3b), (3c), (4a), (4b), (4c), (6), (9a), (9b) or (9c) and Z, apart from the meaning mentioned, can additionally be β-hydroxyethyl. Z as β-hydroxyethyl can be converted after the coupling reaction into the fibre-reactive radicals mentioned for Z.

A very particularly preferred embodiment of the process according to the invention comprises using a diazo component of the formula (21) in which D is as defined in formula (8) or in which D is as defined in formula (9a), (9b) or (9c) and X' is a triazine or pyrimidine radical, in particular a 2,4,5-trichloro-6-pyrimidinyl or 2,4-difluoro-5-chloro-6-pyrimidinyl radical.

A likewise very particularly preferred embodiment of the process according to the invention comprises using a diazo component of the formula (21) in which D is a radical of the formula (9a), (9b) or (9c) and X' is a radical of the formula (10) in which $X_1$ and $X_2$ are as defined in formula (10), in particular in which $X_1$ is F or Cl and $X_2$ is $C_1$-$C_4$alkoxy, $C_1$-$C_4$alkoxy-$C_1$-$C_4$alkoxy; —$NH_2$, $C_1$-$C_4$alkylamino, N,N-di-$C_1$-$C_4$alkylamino, phenylamino, N-$C_1$-$C_4$alkyl-N-phenylamino or naphthylamino, in which the alkyl radicals can be substituted by $C_1$-$C_4$alkoxy, cyano, halogen, hydroxyl, sulfo or sulfato, and the phenyl or naphthyl radical can be substituted by $C_1$-$C_4$alkyl, $C_1$-$C_4$alkoxy, halogen, carboxyl or sulfo; or is morpholino; or in which $X_1$ is fluorine or chlorine, and $X_2$ is a radical of the formula (11) and Q, v, $R_2$ and $X_3$ are as defined in formula (11); or using a diazo component of the formula (21) in which D is a radical of the formula (9a), (9b) or (9c) and X' is a radical of the formula (12) or (14) in which $R_3$, $X_3$, $X_4$, $X_5$, $X_6$ and $X_7$ are as defined above. A likewise very particularly preferred embodiment of the process according to the invention comprises using a diazo component of the formula (21) in which D' is a radical of the formula (9a), (9b) or (9c), and X' is hydrogen, and, after the coupling reaction, reacting the dye with an acylating agent which introduces the radical of the formula (10), (12) or (14).

Examples of suitable amines are

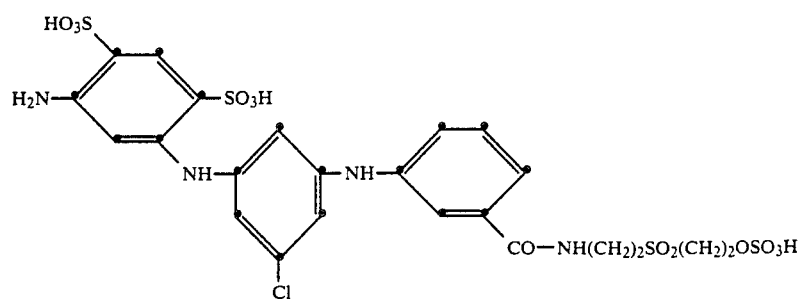

-continued
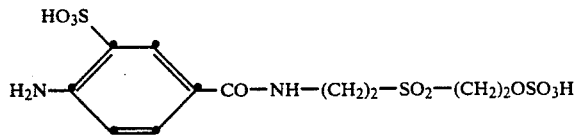
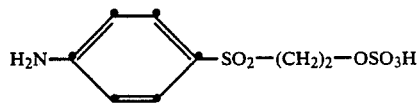
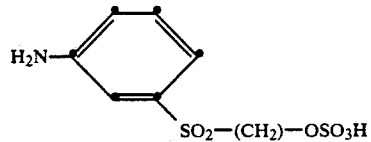
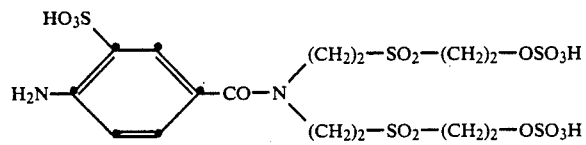
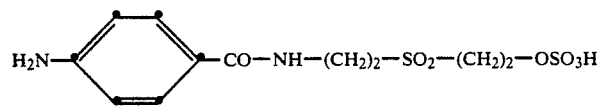
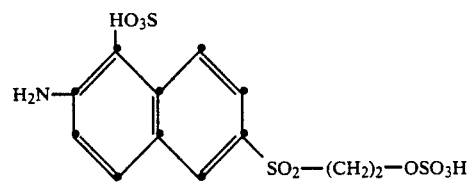
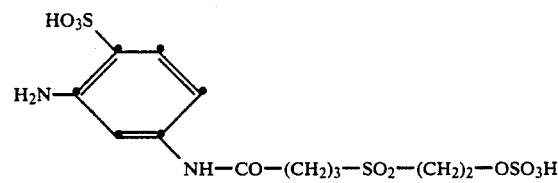
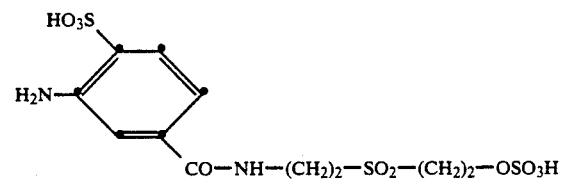
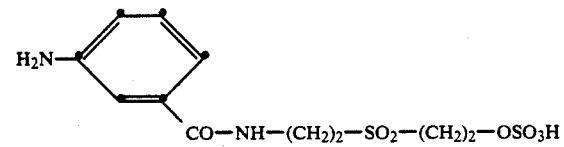
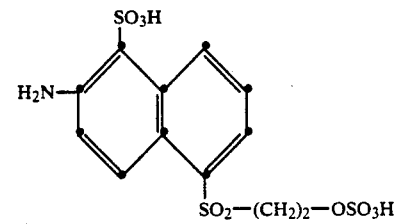

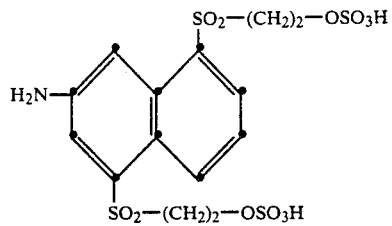
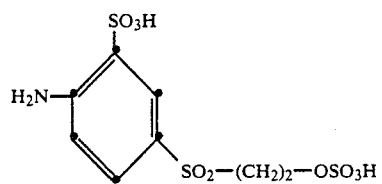
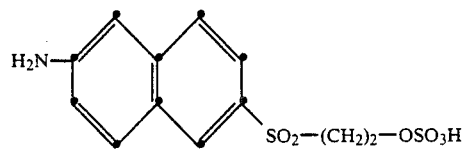
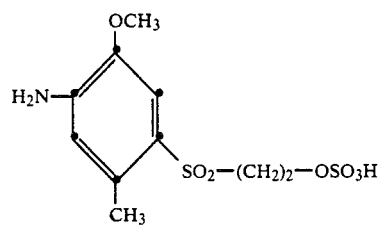
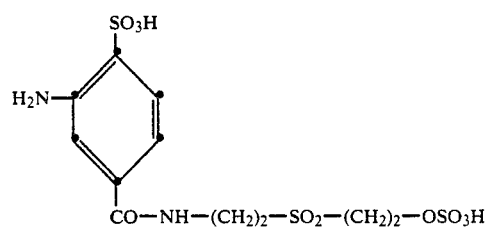
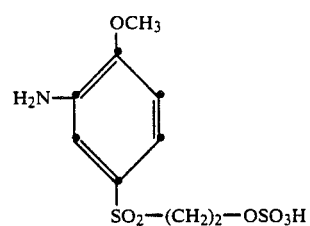
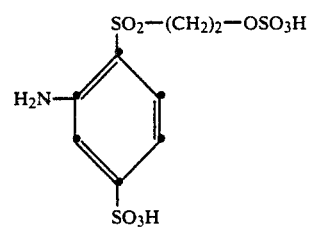
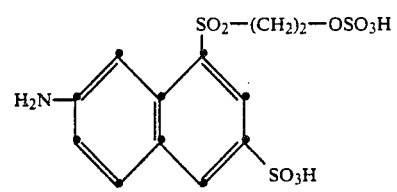

-continued
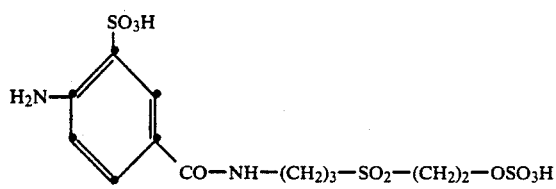
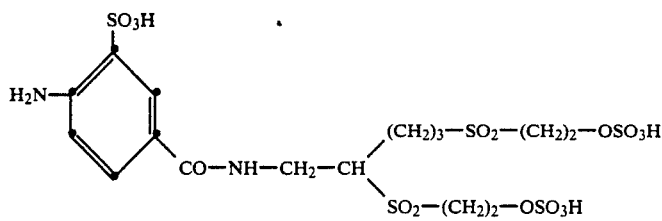
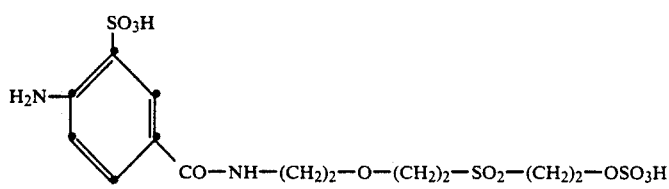
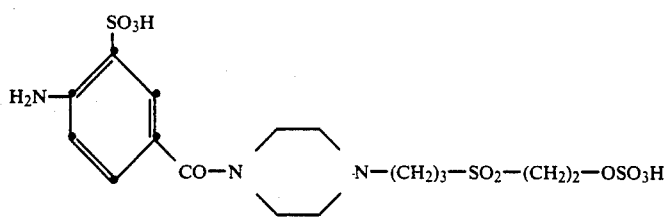
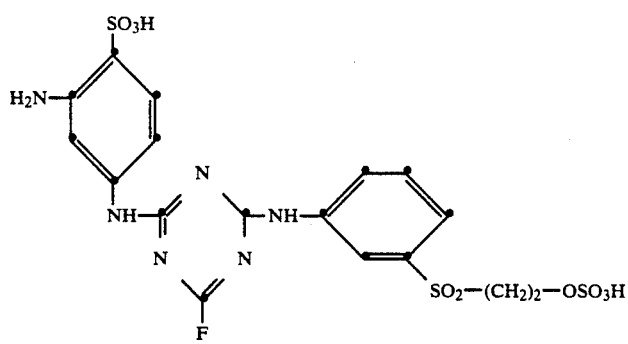
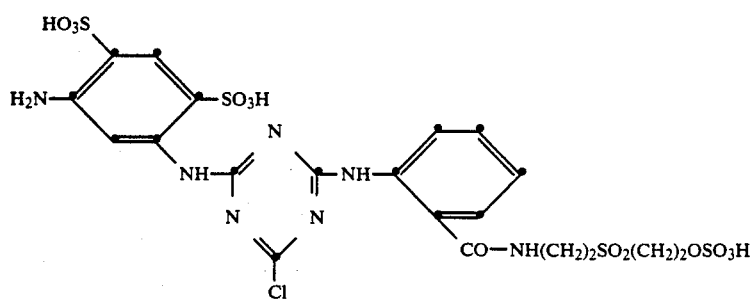

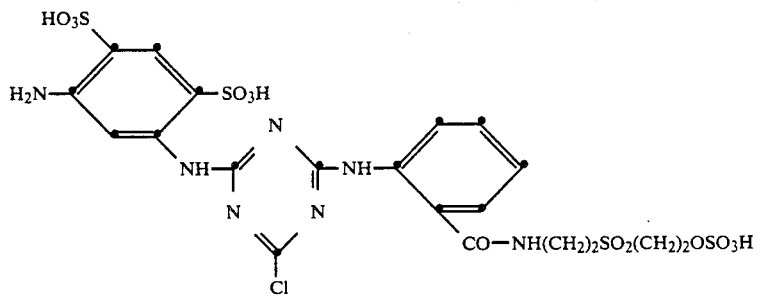
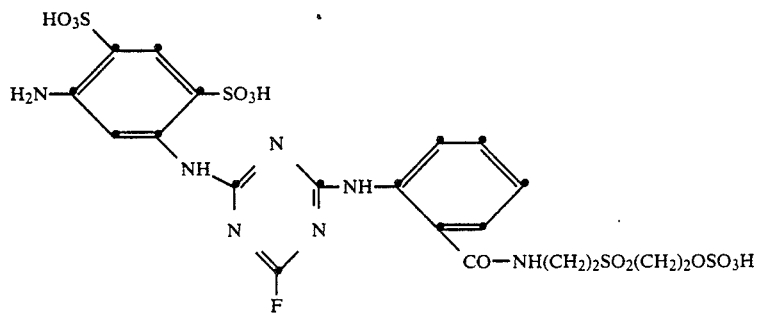
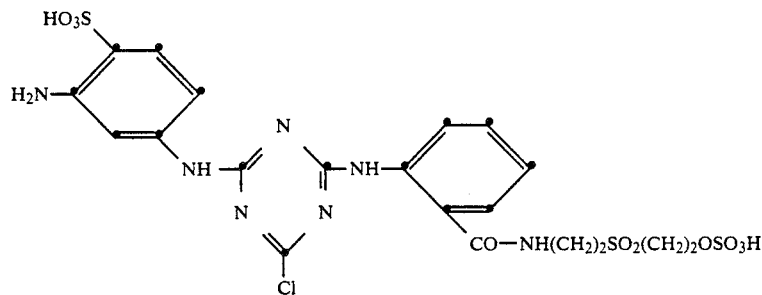
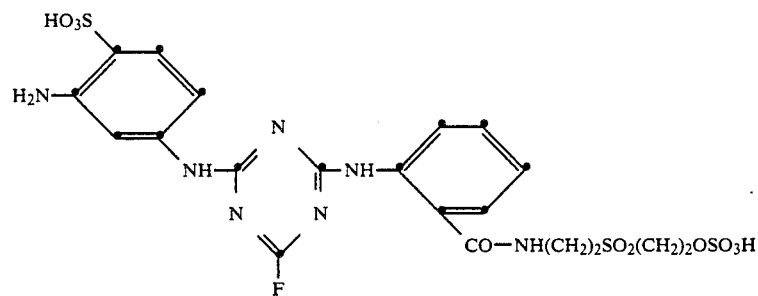
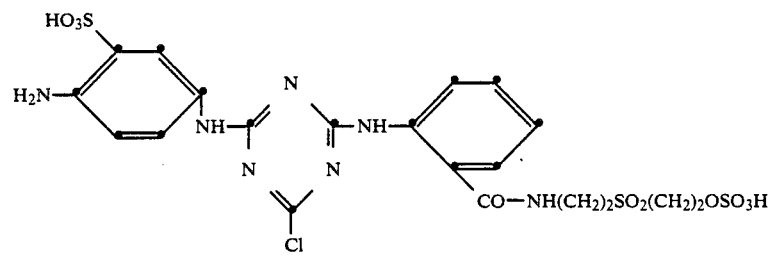
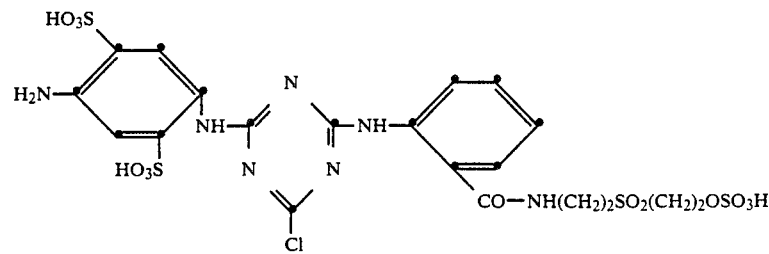

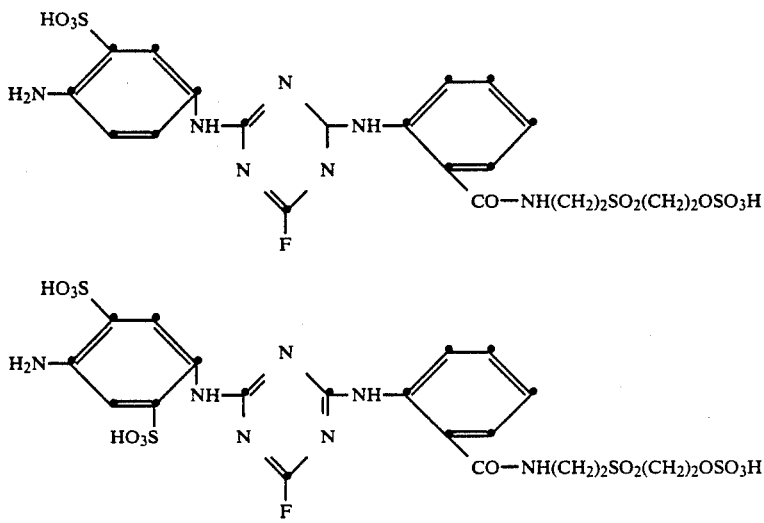

and the corresponding compounds which contain —SO$_2$—(CH$_2$)$_2$—Cl or —SO$_2$CH=CH$_2$ instead of the —SO$_2$—(CH$_2$)$_2$—OSO$_3$H group.

Examples of suitable coupling components of the formula (22) are:

2-($\beta$-cyanoethylamino)-8-hydroxynaphthaline-6-sulfonic acid,
2-($\beta$-carbamoylethylamino)-8-hydroxynaphthaline-6-sulfonic acid,
2-($\beta$-sulfoethylamino)-8-hydroxynaphthaline-6-sulfonic acid,
2-($\beta$-sulfatoethylamino)-8-hydroxynaphthaline-6-sulfonic acid.

The reactive dyes of the formula (18), (19) and (20), which are of very particular importance, are prepared, for example, by diazotizing an amine of the formula

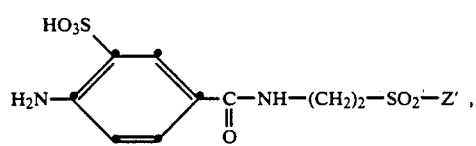
(18a)

or if a dye of the formula (19) is prepared, an amine of the formula

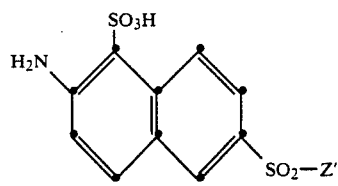
(19a)

in which Z' has the meaning given for Z or is $\beta$-hydroxyethyl, coupling the product onto a coupling component of the formula

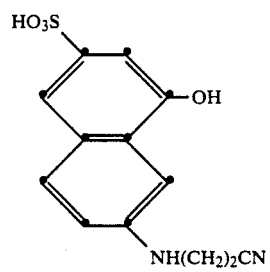
(18b)

and, if Z' in formula (18a) is $\beta$-hydroxyethyl, converting this radical into a radical Z, or if the dye of the formula (20) is prepared, diazotizing an amine of the formula

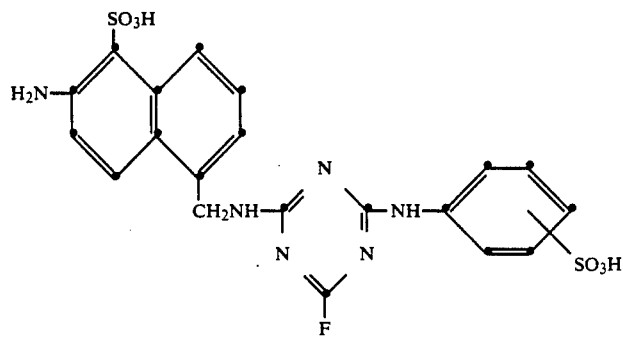
(20a)

and coupling the product onto a coupling component of the formula (18b).

The reactive dyes of the formula (1) are suitable for the dyeing and printing of a large number of materials, such as silk, leather, wool, polyamide fibres and polyurethanes, and in particular cellulose-containing fibre materials of any type. These fibre materials are, for example, natural cellulose fibres, such as cotton, linen and hemp, and cellulose and regenerated cellulose. The reactive dyes of the formula (1) are also suitable for the dyeing or printing of hydroxyl-containing fibres which are present in mixed fabrics, for example mixtures of cotton with polyamide fibres or in particular polyester fibres.

The dyes according to the invention can be applied to the fibre material and fixed on the fibre in various manners, in particular in the form of aqueous dye solutions and printing pastes. They are suitable not only for the exhaust method but also for the pad-dyeing method, according to which the material to be dyed is impregnated with aqueous dye solutions, which may contain salts, and the dyes are fixed after an alkali treatment or in the presence of alkali, if necessary with exposure to heat. After fixing, the dyeings or prints are thoroughly rinsed with cold and hot water, if appropriate with the addition of an agent which acts as a dispersant and promotes the diffusion of the nonfixed portions.

The reactive dyes of the formula (1) are distinguished by high reactivity, good fixation properties and very good build-up properties. They can therefore be used in the exhaust method at low dyeing temperatures and require only short steaming times in the pad-steam method. The degrees of fixation are high and the nonfixed portions can be easily washed out, the difference between the degree of exhaustion and degree of fixation being remarkably small, that is, the soaping loss is very small. The reactive dyes of the formula (1) are also particularly suitable for printing, in particular on cotton, but also for the printing of nitrogen-containing fibres, for example wool or silk or mixed fabrics which contain wool or silk.

The dyeings and prints on cellulose fibre materials obtained by means of the dyes according to the invention have a high colour strength and a high fibre-dye affinity, not only in acid but also in alkaline range, furthermore good light fastness and very good wet fastness properties, such as wash, water, seawater, cross-dyeing and perspiration fastness properties, and also good pleating fastness, hot press fastness and rub fastness. Furthermore, the dyeings and prints obtained by means of the dyes according to the invention are suitable for further finishing processes of the textile material, for example synthetic resin finishing.

The examples which follow serve to illustrate the invention. The temperatures are given in degrees Centigrade, and parts and percentages are by weight, unless stated otherwise. Part by weight relate to parts by volume as the kilogram relates to the liter.

The preparation of the monoazo compounds is described in the exemplary embodiments which follow not in all cases, but it is obvious from the general description.

EXAMPLE 1

134 parts of 1,3-phenylenediamine-4,6-disulfonic acid are dissolved in 500 parts of water at room temperature (about 20° C.) and a pH of 4. This solution is added dropwise over a period of about 1 hour to a suspension of 93 parts of cyanuric chloride in 800 parts of ice/water mixture at such a rate that at a temperature of 0° to 3° to the pH does not exceed 4.0. The reaction mixture is then allowed to complete the reaction at 0° to 3° for 1½ hours and a pH between 3.5–4.5. 176 parts of 3-amino-2'-(2-sulfatoethylsulfonyl)ethylbenzamide are then added, and the condensation reaction is carried out at 0° to 5° C. and a pH between 4 and 4.5 for 2 hours. The resulting reaction solution is diazotized in a conventional manner and coupled onto a suspension of 97 parts of 2-($\beta$-cyanoethylamino)-8-hydroxylnaphthaline-6-sulfonic acid in 500 parts of water at a pH of about 1.0. After two hours, the coupling reaction is completed. The pH of the reaction solution is brought to 6.0. The product is then purified and demineralized by reverse osmosis and spray-dryed. This gives 380 parts of a compound which, in the form of the free acid, has the formula

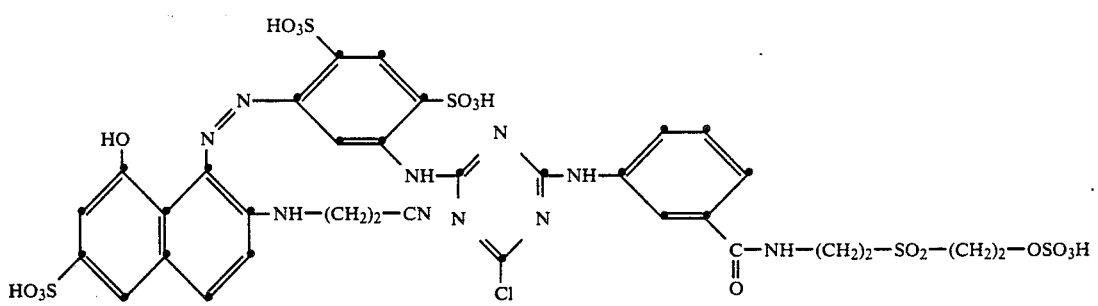

(101)

The dye thus obtained dyes cotton in bordeaux hues which have very good general fastness properties.

EXAMPLE 2

The aqueous solution of the dye obtained according to Example 1 is vinylated at room temperature and at a pH of 10 for about 30 minutes. The pH is then brought back to 6.5 with hydrochloric acid, and the monoazo dye is spray-dried. The dye obtained, in the form of the free acid, has the formula

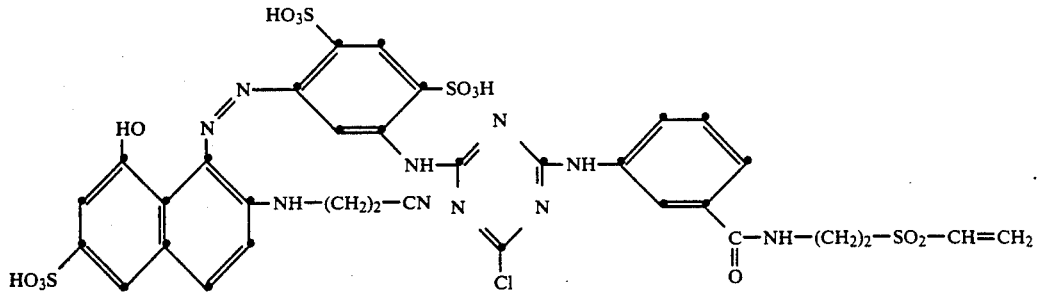

(102)

It dyes cotton in bordeaux hues which have very good general fastness properties.

EXAMPLE 3

37.0 part of the compound of the formula

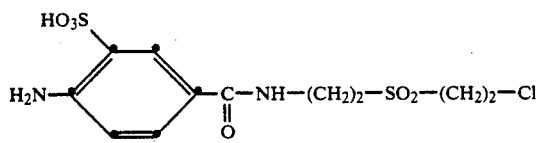

are diazotized in the usual manner and coupled onto a suspension of 29.2 parts of 2-(β-cyanoethylamino)-8-hydroxynaphthaline-6-sulfonic acid in 200 parts of water at a pH of about 1.0 to 2.0 over a period of two hours. The pH is then brought to 6.0. The solution obtained is demineralized by means of reverse osmosis and then spray-dried. This gives a salt-free compound which, in the form of the free acid, has the formula

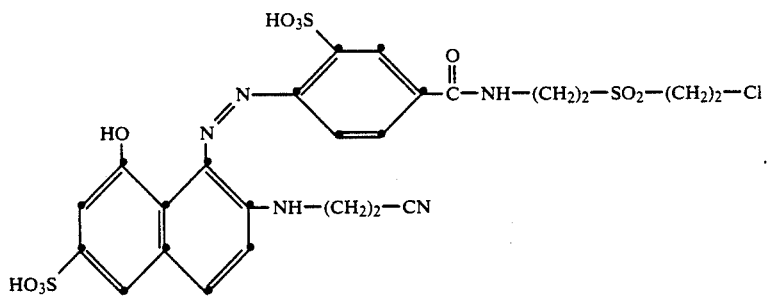

(103)

The resulting dye dyes cotton in bordeaux hues which have excellent fastness properties.

EXAMPLE 4

The aqueous solution of the dye obtained according to Example 3 is vinylated at room temperature and a pH of 10 for 20 minutes. The pH is then brought back to 5.0 with hydrochloric acid, and the monoazo dye is spray-dried. In the form of the free acid, it has the formula

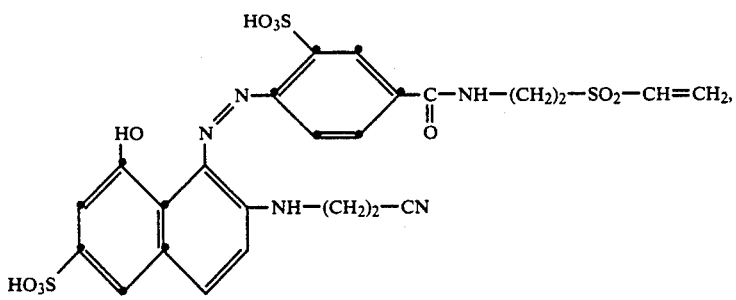

(104)

It dyes cotton in bordeaux hues which have very good fastness properties.

Further dyes which can be prepared according to the procedures given in the previous Examples are the reactive dyes of the formulae below which dye cotton in bordeaux hues.

| Example | | Reactive dye |
|---|---|---|
| 5 | Structure with HO₃S-naphthalene-OH, NHC₂H₄C(=O)NH₂, N=N-phenyl-SO₂CH₂CH₂OSO₃H | (105) |
| 6 | Structure with HO₃S-naphthalene-OH, NHC₂H₄SO₃H, N=N-phenyl-SO₂CH₂CH₂OSO₃H | (106) |
| 7 | Structure with HO₃S-naphthalene-OH, NHC₂H₄C(=O)NH₂, N=N-phenyl(SO₃H)-C(=O)-NHCH₂CH₂SO₂CH=CH₂ | (107) |
| 8 | Structure with HO₃S-naphthalene-OH, NHC₂H₄SO₃H, N=N-phenyl(SO₃H)-C(=O)-N(CH₂CH₂SO₂CH=CH₂)₂ | (108) |
| 9 | Structure with HO₃S-naphthalene-OH, NHC₂H₄CN, N=N-phenyl-C(=O)-NHCH₂CH₂SO₂CH₂CH₂OSO₃H | (109) |

-continued

| Example | | Reactive dye |
|---|---|---|
| 10 | HO₃S-[naphthalene with OH]-N=N-[benzene]-C(=O)-NHCH₂CH₂SO₂CH₂CH₂OSO₃H, with NHC₂H₄SO₃H | (110) |
| 11 | HO₃S-[naphthalene with OH, NHC₂H₄SO₃H]-N=N-[naphthalene with SO₃H, SO₂CH₂CH₂OSO₃H] | (111) |
| 12 | HO₃S-[naphthalene with OH, NHC₂H₄OSO₃H]-N=N-[naphthalene with SO₃H, SO₂CH₂CH₂OSO₃H] | (112) |
| 13 | HO₃S-[naphthalene with OH, NHC₂H₄CN]-N=N-[benzene with SO₃H]-C(=O)-NHCH₂CH₂SO₂CH₂CH₂OSO₃H | (113) |
| 14 | HO₃S-[naphthalene with OH, NHC₂H₄CN]-N=N-[benzene with SO₃H]-NHC(=O)-(CH₂)₃SO₂CH=CH₂ | (114) |

-continued

| Example | | Reactive dye |
|---|---|---|
| 15 | (structure) | (115) |
| 16 | (structure) | (116) |
| 17 | (structure) | (117) |
| 18 | (structure) | (118) |
| 19 | (structure) | (119) |

| Example | | Reactive dye |
|---|---|---|
| 20 | Structure with HO$_3$S, OH, NHC$_2$H$_4$CN on naphthalene coupled via N=N to naphthalene with SO$_3$H and SO$_2$CH$_2$CH$_2$OSO$_3$H | (120) |
| 21 | Structure with HO$_3$S, OH, NHC$_2$H$_4$CN on naphthalene coupled via N=N to benzene with OCH$_3$, CH$_3$, SO$_2$CH$_2$CH$_2$OSO$_3$H | (121) |
| 22 | Structure with HO$_3$S, OH, NHC$_2$H$_4$CN on naphthalene coupled via N=N to benzene with SO$_3$H and CONHCH$_2$CH$_2$SO$_2$CH$_2$CH$_2$OSO$_3$H | (122) |
| 23 | Structure with HO$_3$S, OH, NHC$_2$H$_4$CNH$_2$ (with C=O) on naphthalene coupled via N=N to naphthalene with SO$_3$H and SO$_2$CH$_2$CH$_2$OSO$_3$H | (123) |
| 24 | Structure with HO$_3$S, OH, NHC$_2$H$_4$CNH$_2$ (with C=O) on naphthalene coupled via N=N to naphthalene with SO$_3$H and SO$_2$CH$_2$CH$_2$OSO$_3$H | (124) |

-continued

| Example | | Reactive dye |
|---|---|---|
| 25 | ![structure: 6-sulfo-2-hydroxy-7-(2-cyanoethylamino)naphthalene azo-coupled to 2-methoxy-5-(β-sulfatoethylsulfonyl)phenyl] | (125) |
| 26 | ![structure: 6-sulfo-2-hydroxy-7-(2-cyanoethylamino)naphthalene azo-coupled to 2-(β-sulfatoethylsulfonyl)-5-sulfophenyl] | (126) |
| 27 | ![structure: 6-sulfo-2-hydroxy-7-(NHC₂H₄CONH₂)naphthalene azo-coupled to 8-sulfo-3-(β-sulfatoethylsulfonyl)naphth-2-yl] | (127) |
| 28 | ![structure: 6-sulfo-2-hydroxy-7-(NHC₂H₄CN)naphthalene azo-coupled to 1-(β-sulfatoethylsulfonyl)-6-sulfonaphth-3-yl] | (128) |
| 29 | ![structure: 6-sulfo-2-hydroxy-7-(NHC₂H₄CN)naphthalene azo-coupled to 2-sulfo-4-(CONH(CH₂)₃SO₂CH=CH₂)phenyl] | (129) |

-continued
| Example | | Reactive dye |
|---|---|---|
| 30 | 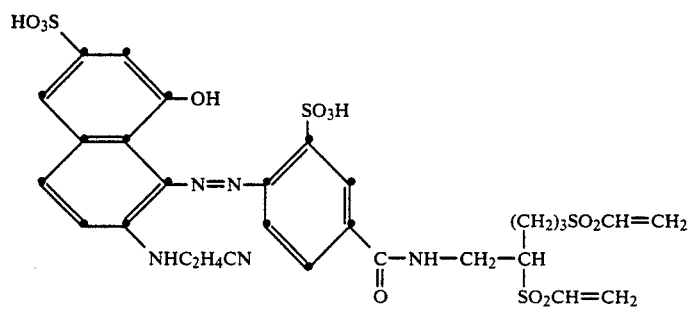 | (130) |
| 31 | 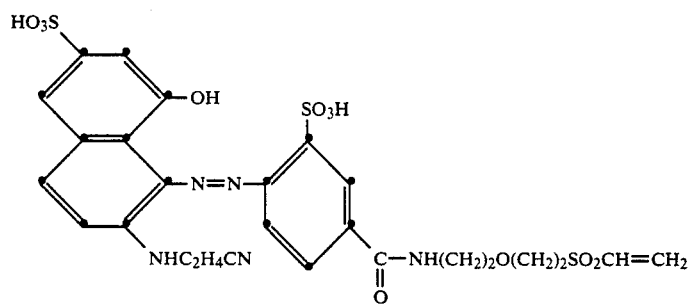 | (131) |
| 32 | 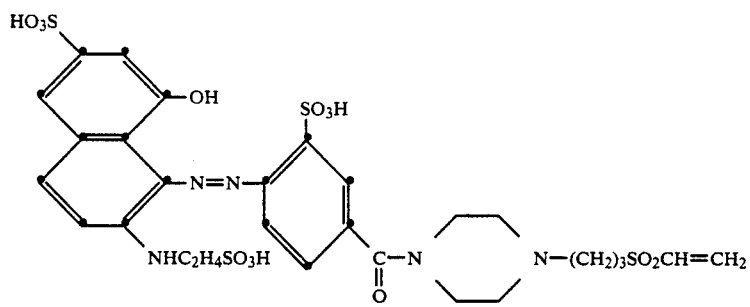 | (132) |
| 33 | 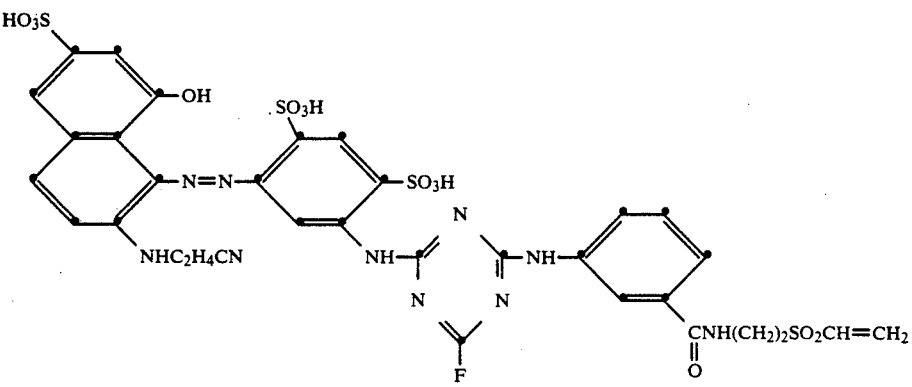 | (133) |

| Example | | Reactive dye |
|---|---|---|
| 34 | 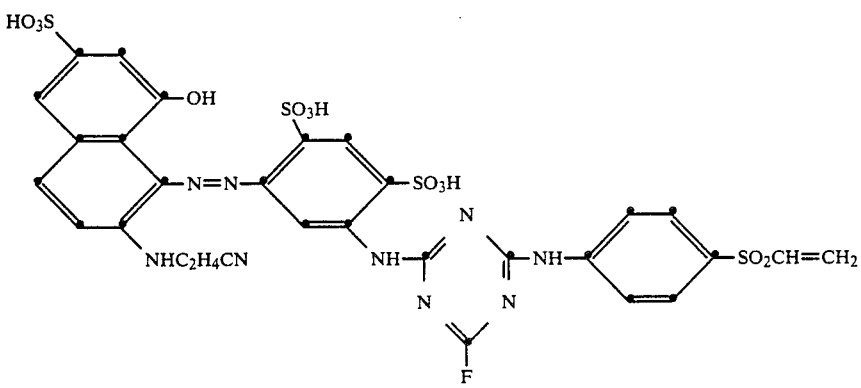 | (134) |
| 35 | 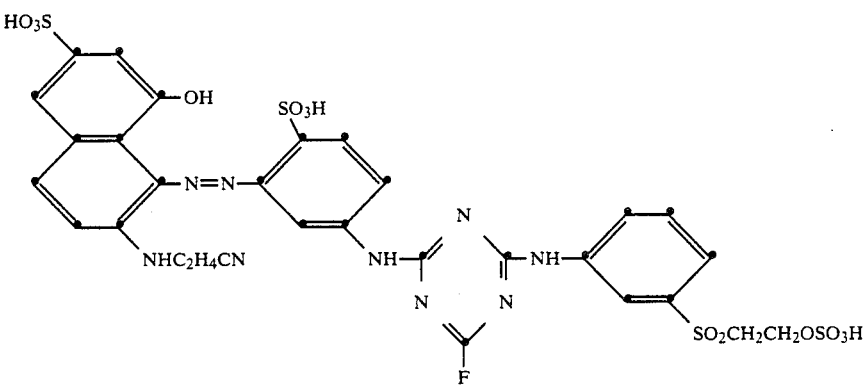 | (135) |
| 36 | 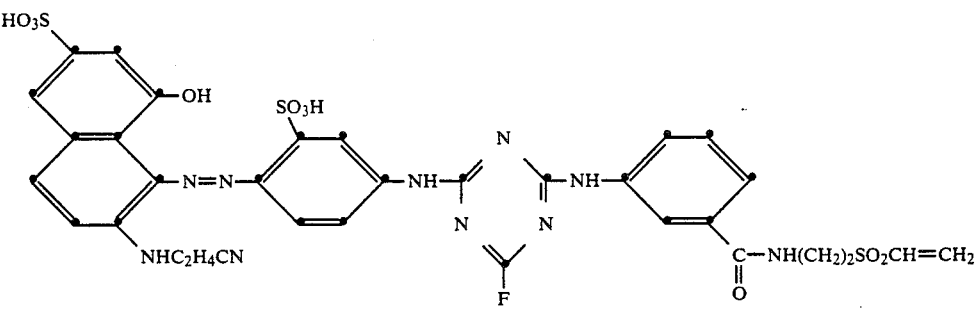 | (136) |
| 37 | 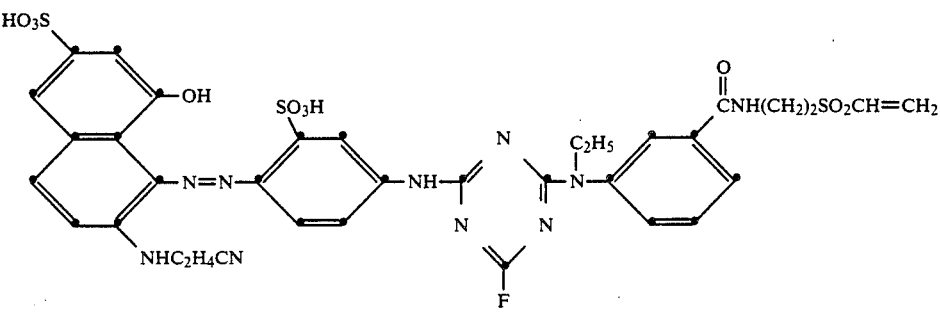 | (137) |

-continued
| Example | | Reactive dye |
|---|---|---|
| 38 | 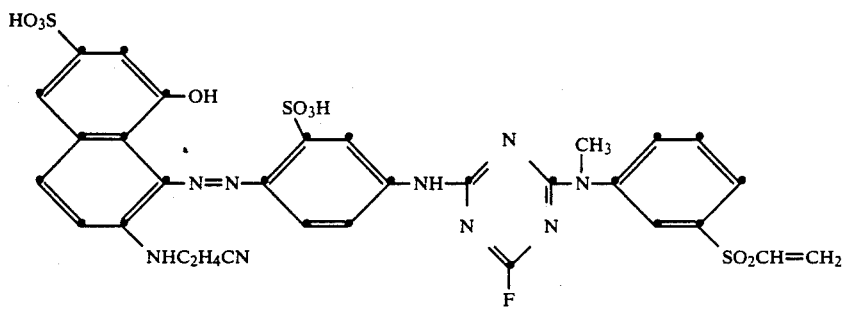 | (138) |
| 39 | 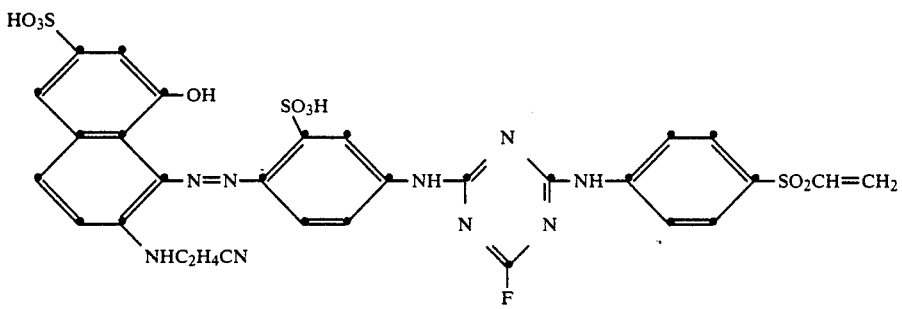 | (139) |
| 40 | 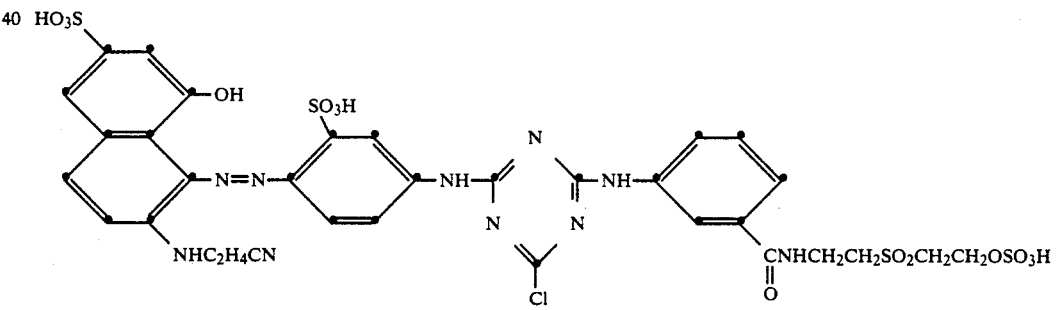 | (140) |
| 41 | 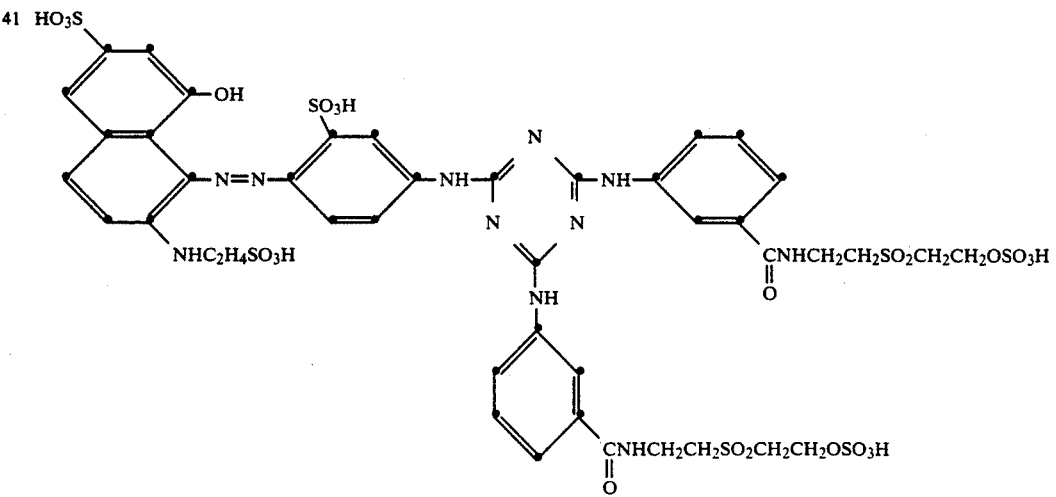 | (141) |

| Example | | Reactive dye |
|---|---|---|
| 42 | 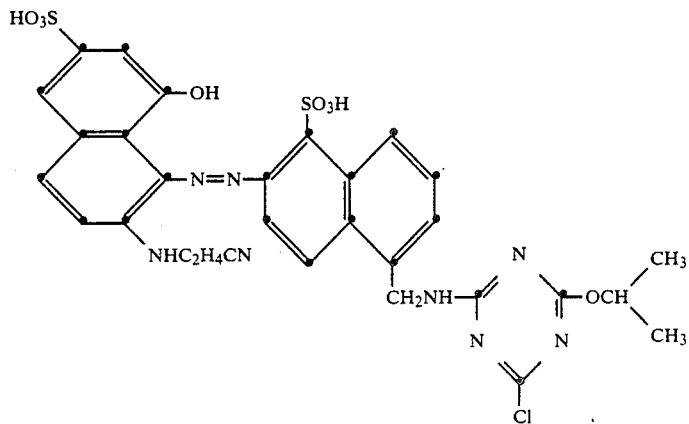 | (142) |
| 43 | 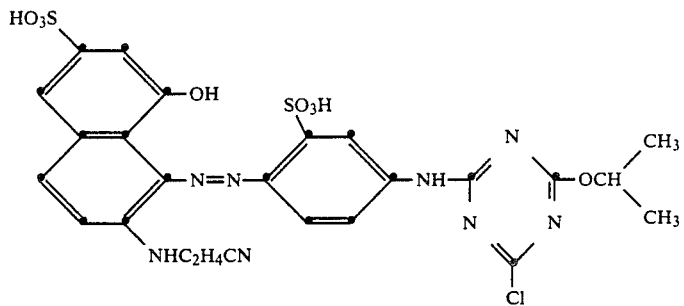 | (143) |
| 44 | 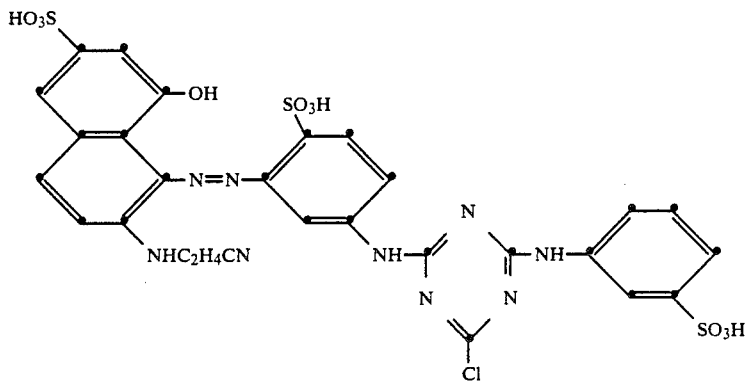 | (144) |

-continued
| Example | | Reactive dye |
|---|---|---|
| 45 | 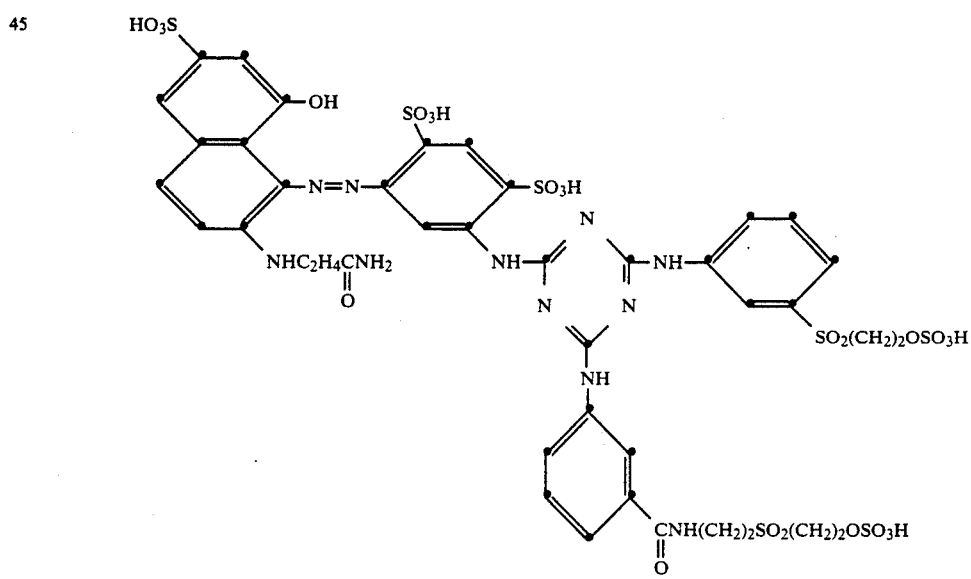 | (145) |
| 46 | 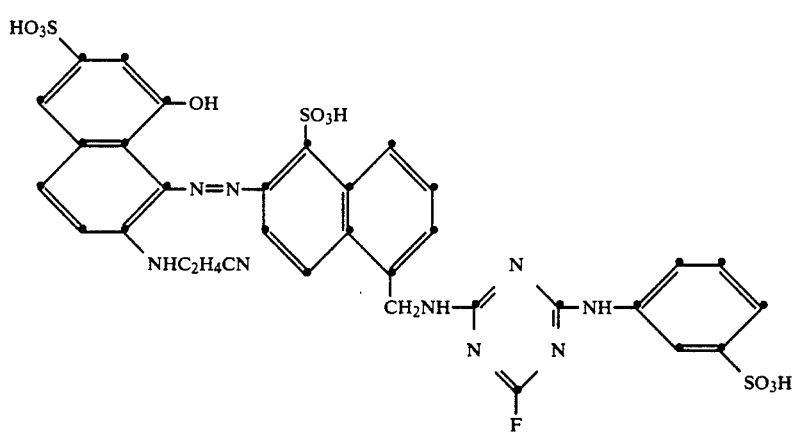 | (146) |
| 47 | 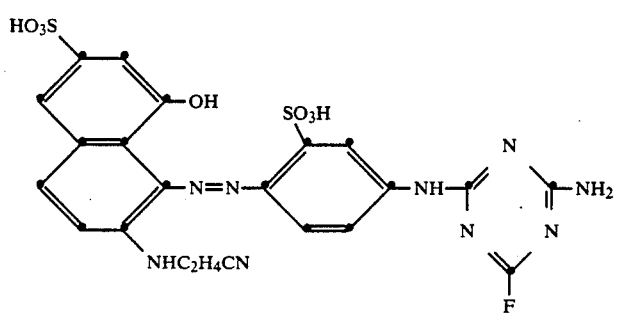 | (147) |

| Example | | Reactive dye |
|---|---|---|
| 48 | 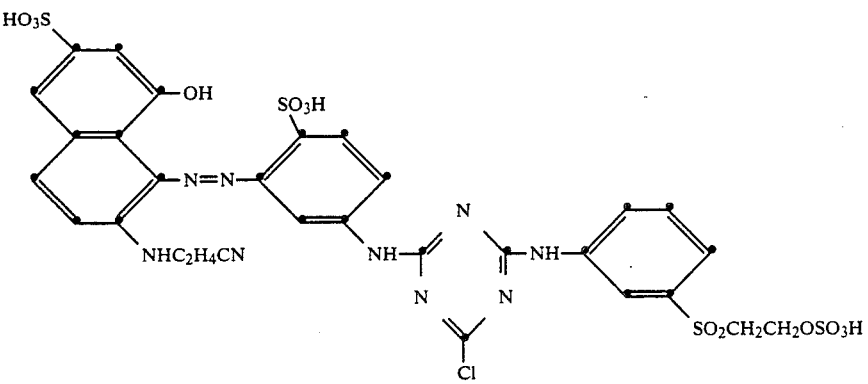 | (148) |
| 49 | 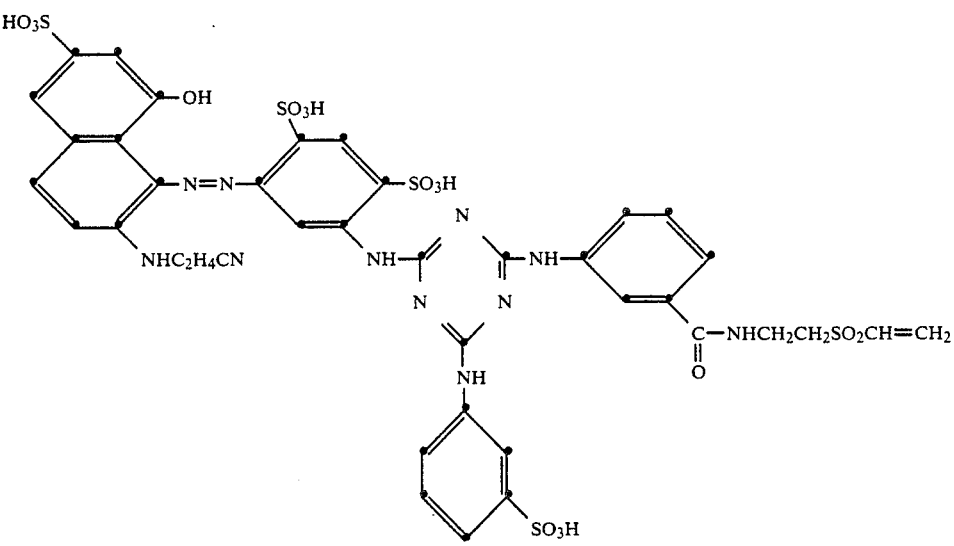 | (149) |
| 50 | 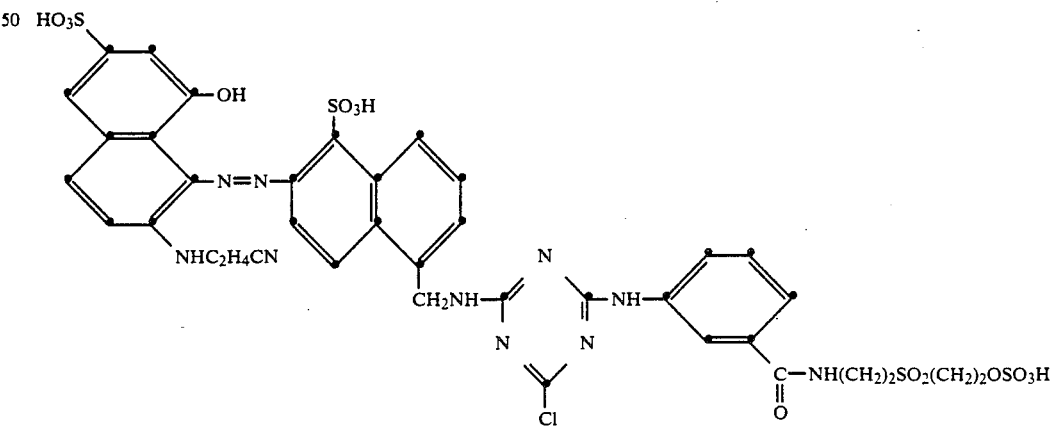 | (150) |

| Example | | Reactive dye |
|---|---|---|
| 51 | 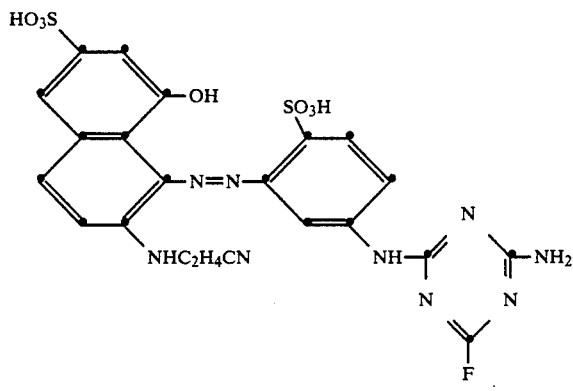 | (151) |
| 52 | 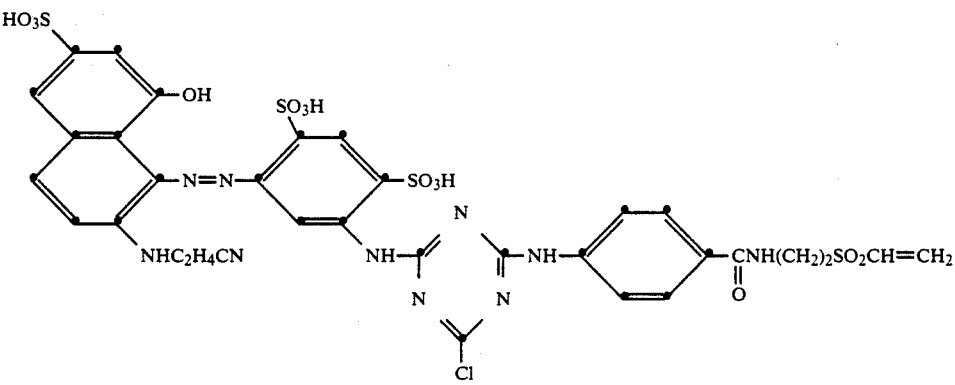 | (152) |
| 53 | 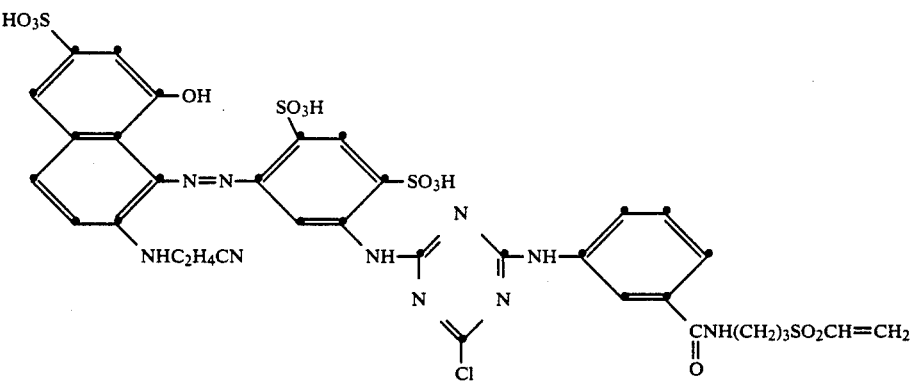 | (153) |
| 54 | 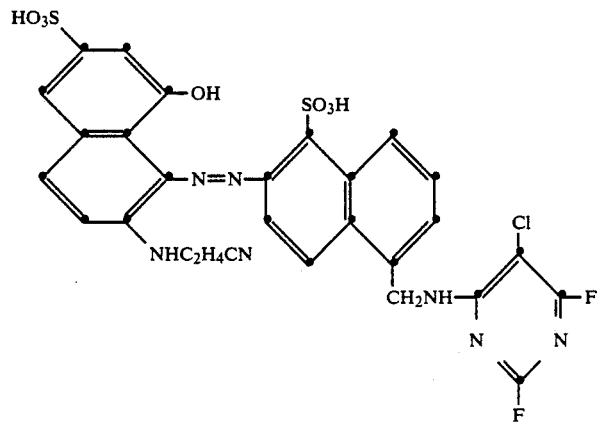 | (154) |

| Example | | Reactive dye |
|---|---|---|
| 55 | 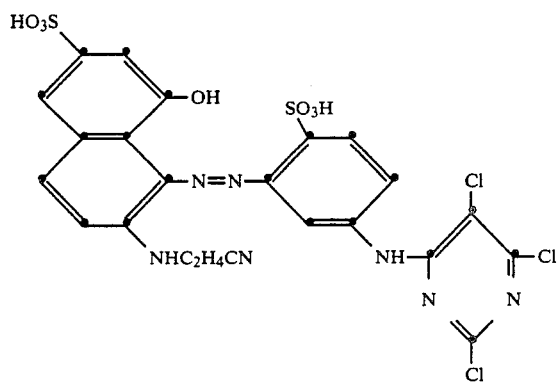 | (155) |
| 56 | 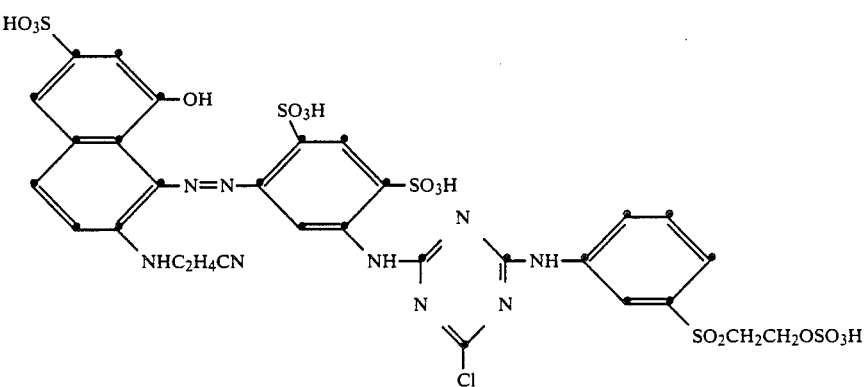 | (156) |
| 57 | 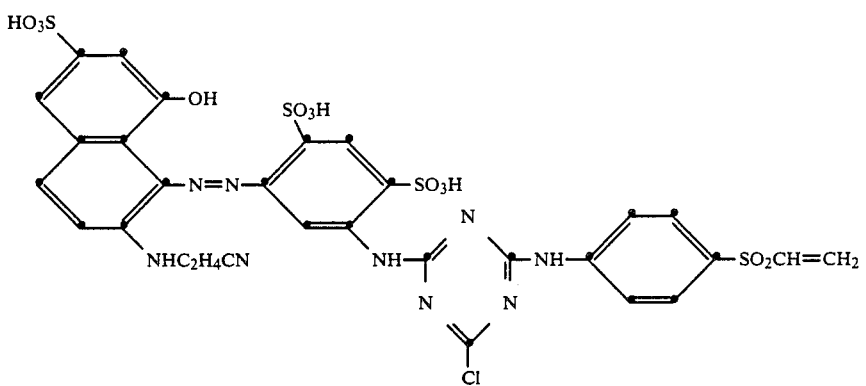 | (157) |
| 58 | 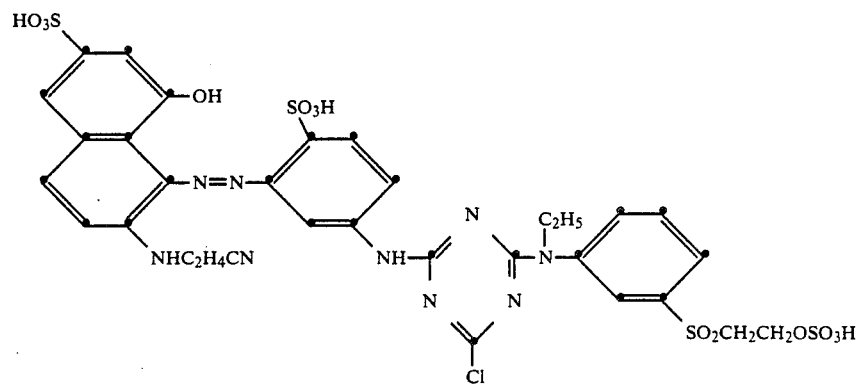 | (158) |

-continued

| Example | | Reactive dye |
|---|---|---|
| 59 | ![structure with naphthalene-SO3H, OH, NHC2H4CN, azo link to benzene-SO3H, NH-triazine(Cl) with N(C2H5)-phenyl-SO2CH=CH2] | (159) |
| 60 | ![structure with naphthalene-SO3H, OH, NHC2H4CN, azo to benzene-SO3H, NH-triazine(F), NH(CH2)2O(CH2)2SO2CH=CH2] | (160) |
| 61 | ![structure with naphthalene-SO3H, OH, NHC2H4CN, azo to benzene-SO3H, NH-triazine(F), NH(CH2)SO2CH=CH2] | (161) |
| 62 | ![structure with naphthalene-SO3H, OH, NHC2H4CN, azo to benzene-SO3H, NH-triazine(F), NHCH with (CH2)3SO2CH=CH2 and SO2CH=CH2] | (162) |

-continued
| Example | | Reactive dye |
|---|---|---|
| 63 | 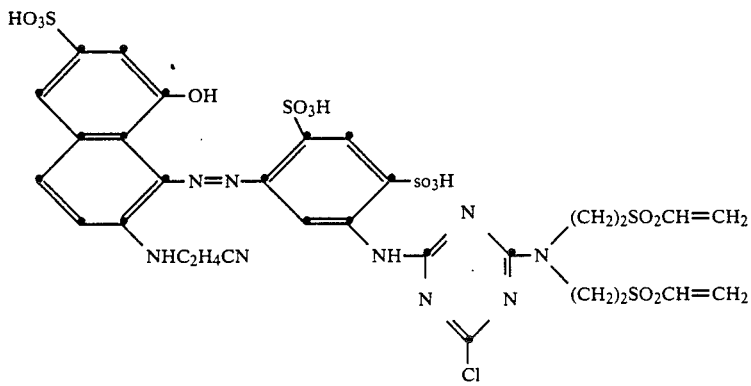 | (163) |
| 64 | 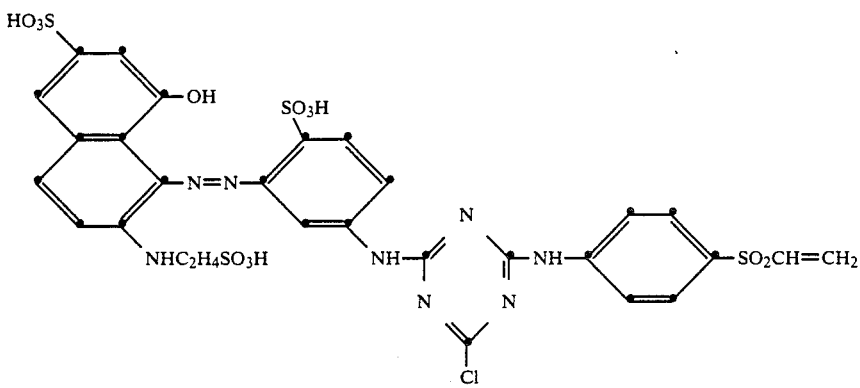 | (164) |
| 65 | 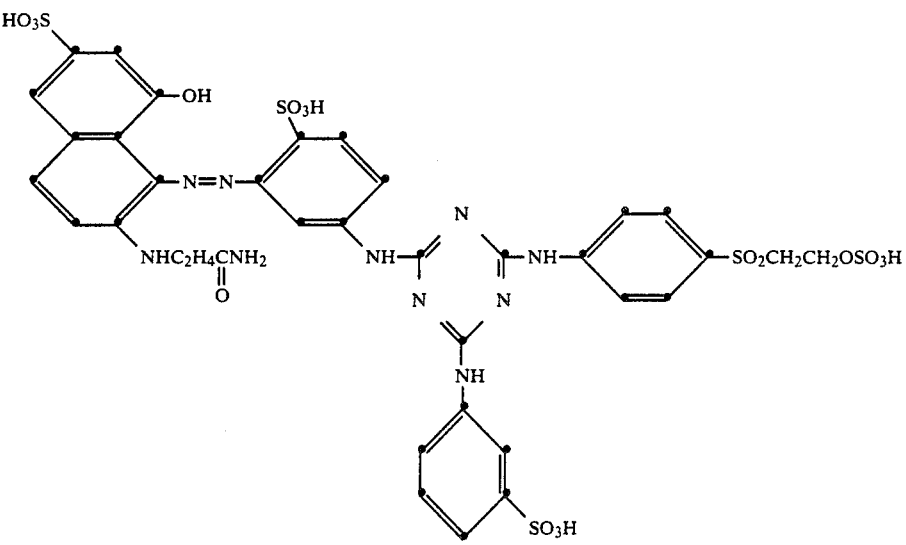 | (165) |

-continued
| Example | | Reactive dye |
|---|---|---|
| 66 | 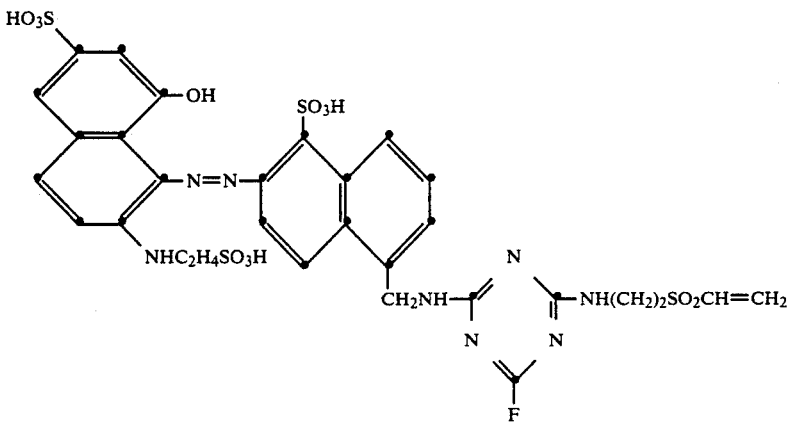 | (166) |
| 67 | 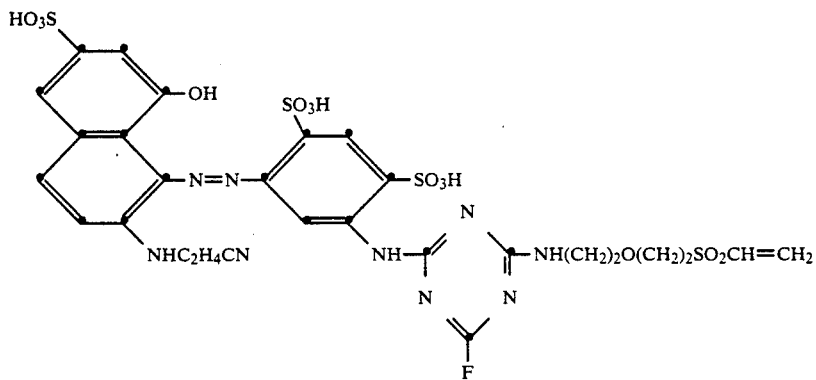 | (167) |
| 68 | 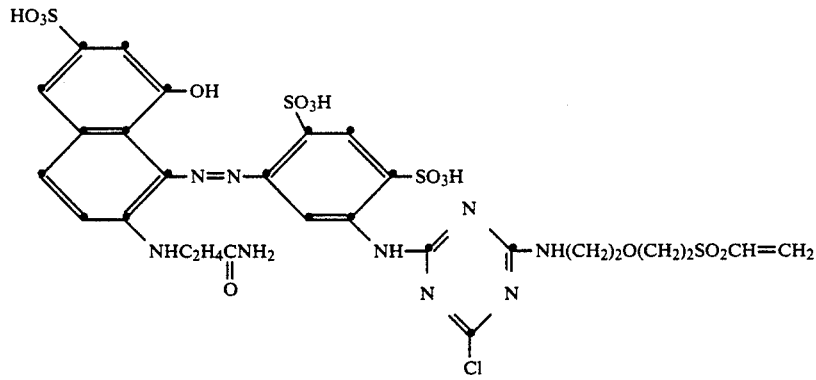 | (168) |
| 69 | 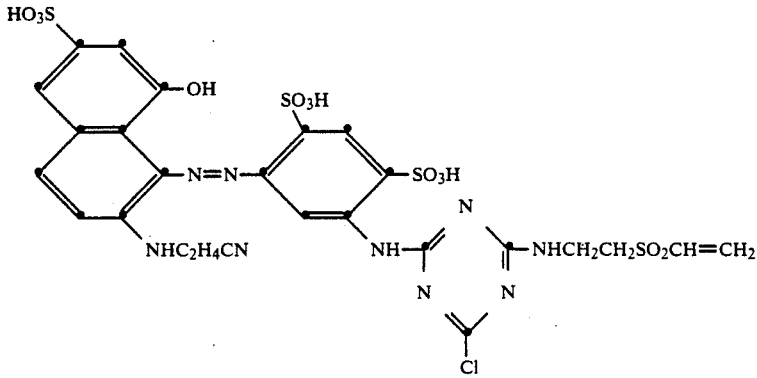 | (169) |

| Example | | Reactive dye |
|---|---|---|
| 70 | 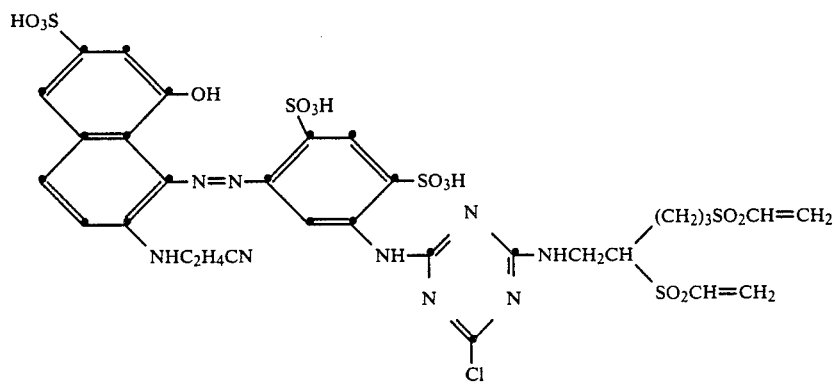 | (170) |
| 71 | 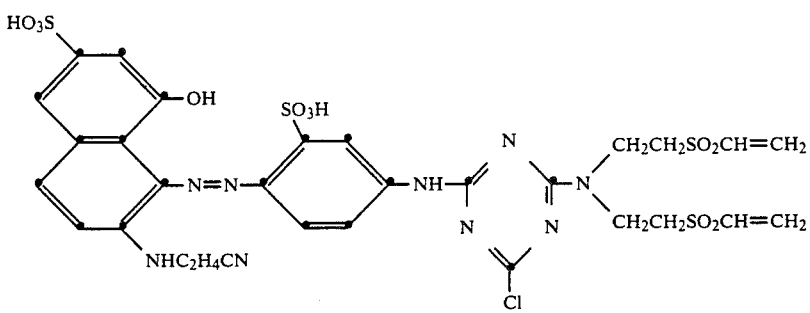 | (171) |
| 72 | 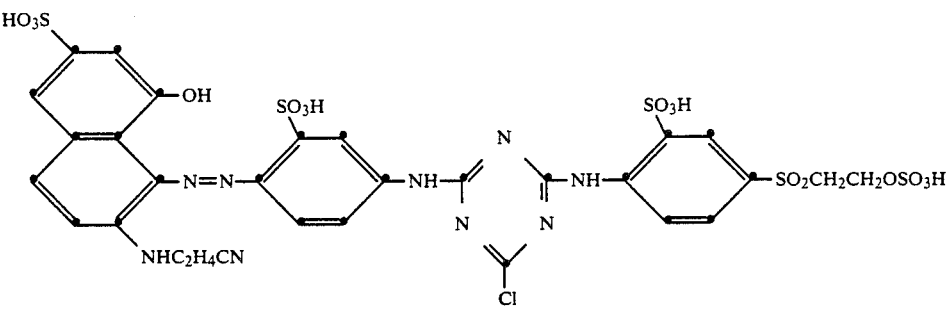 | (172) |
| 73 | 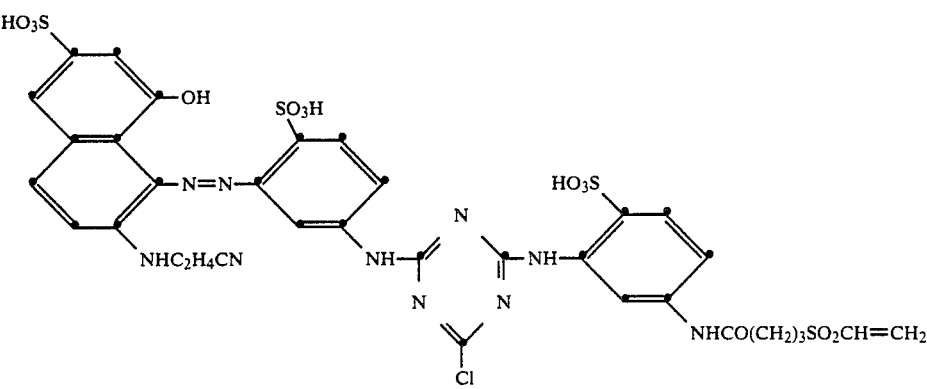 | (173) |

| Example | | Reactive dye |
|---|---|---|
| 74 | 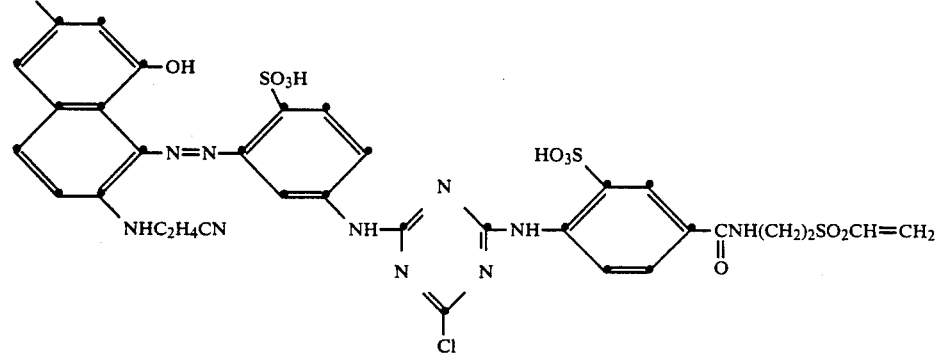 | (174) |
| 75 | 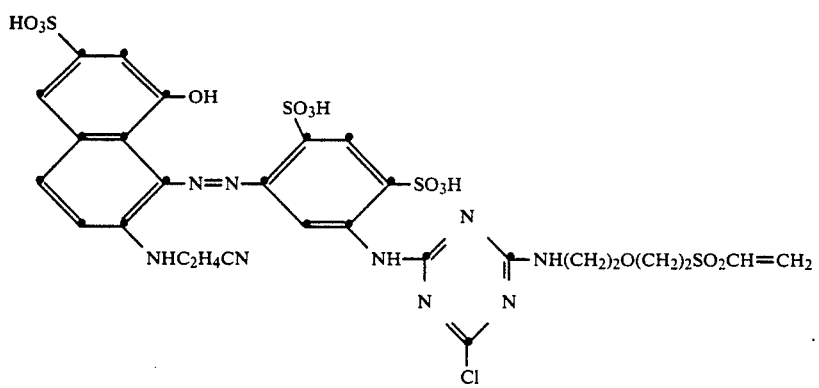 | (175) |
| 76 | 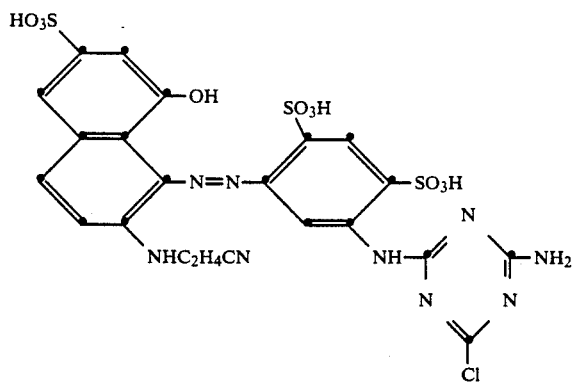 | (176) |
| 77 | 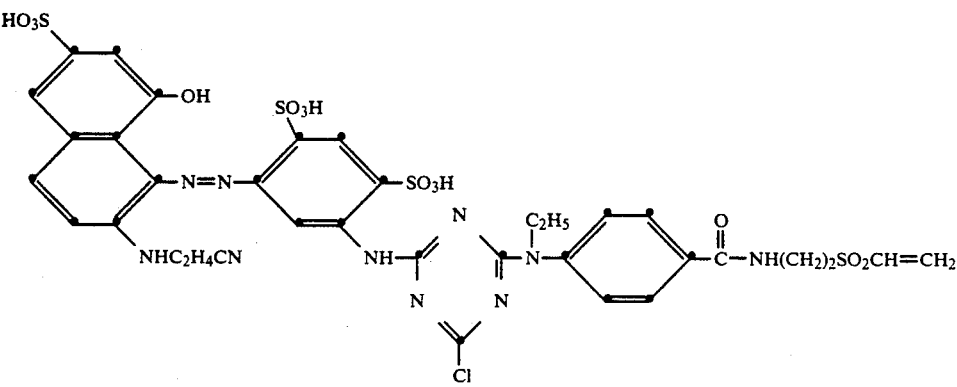 | (177) |

-continued
| Example | | Reactive dye |
|---|---|---|
| 78 | 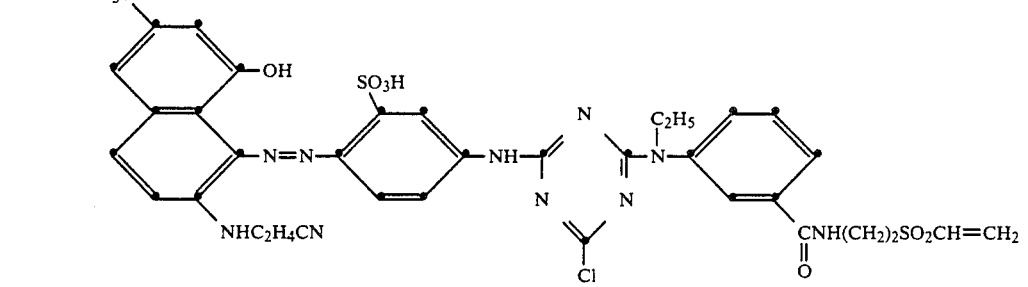 | (178) |
| 79 | 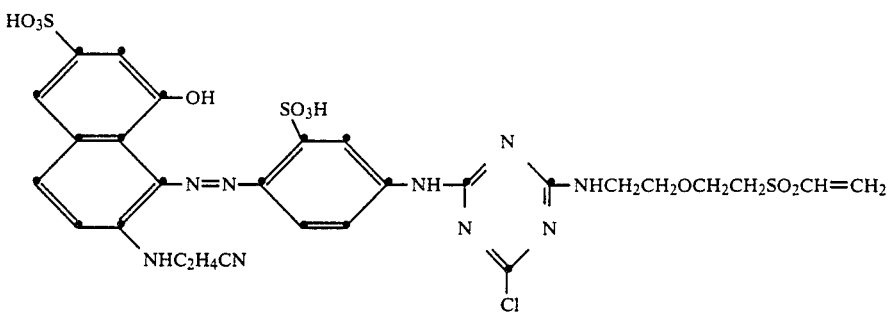 | (179) |
| 80 | 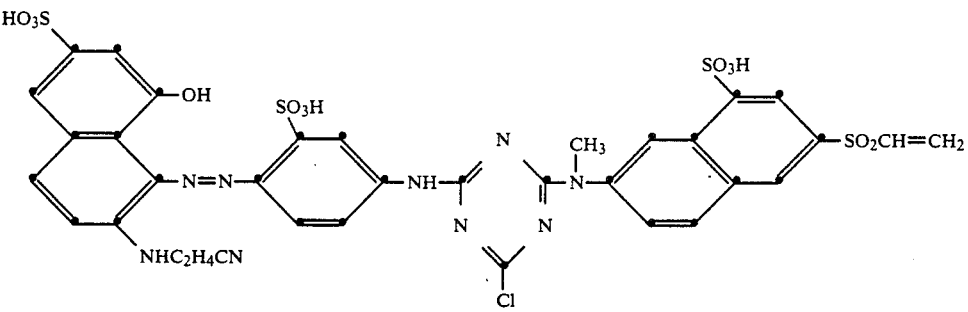 | (180) |
| 81 | 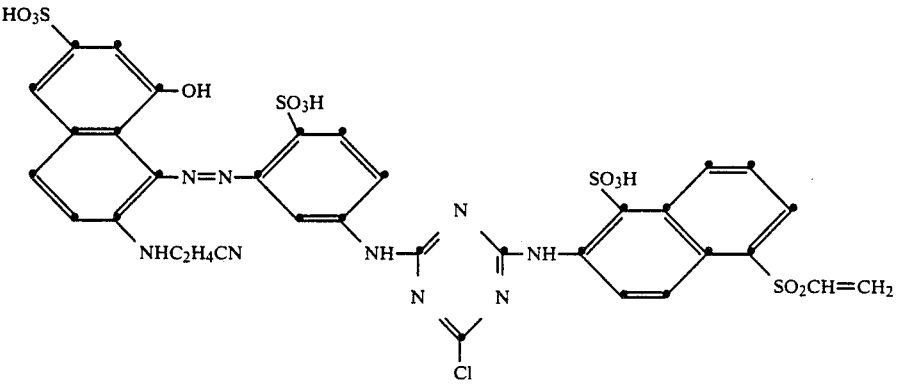 | (181) |

-continued
| Example | | Reactive dye |
|---|---|---|
| 82 | 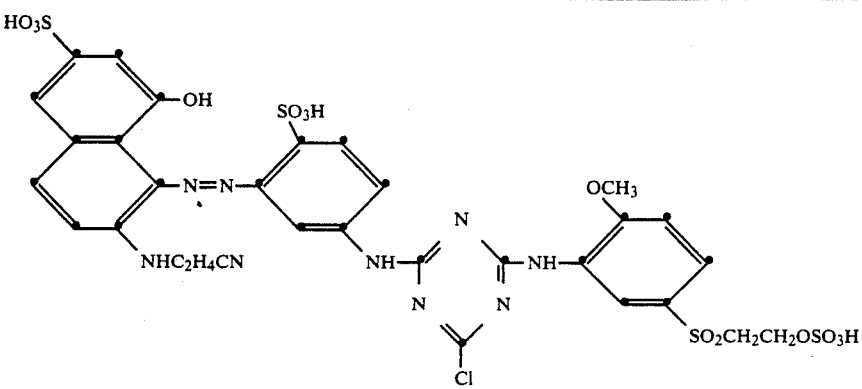 | (182) |
| 83 | 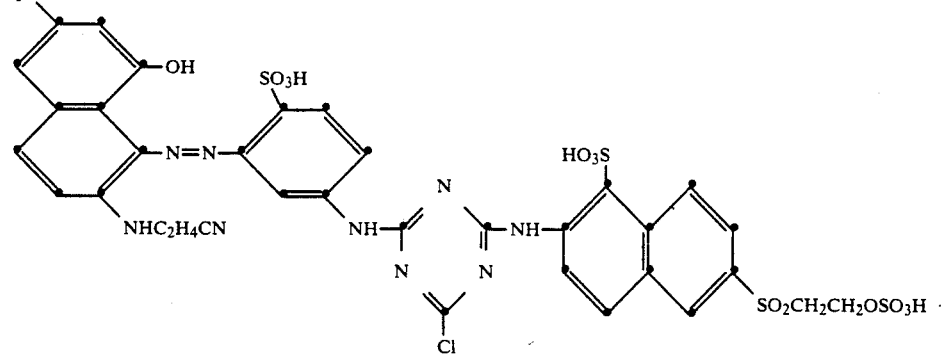 | (183) |
| 84 | 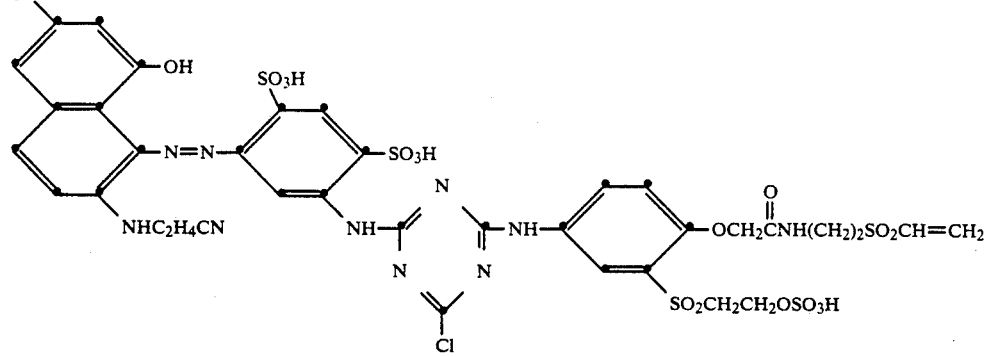 | (184) |
| 85 | 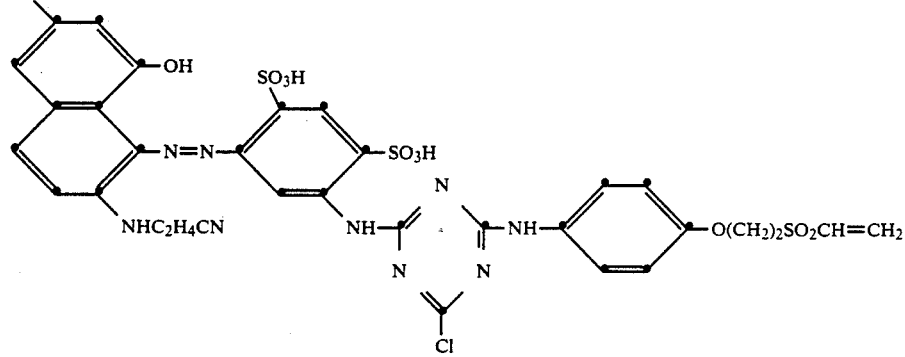 | (185) |

-continued
| Example | | Reactive dye |
|---|---|---|
| 86 | 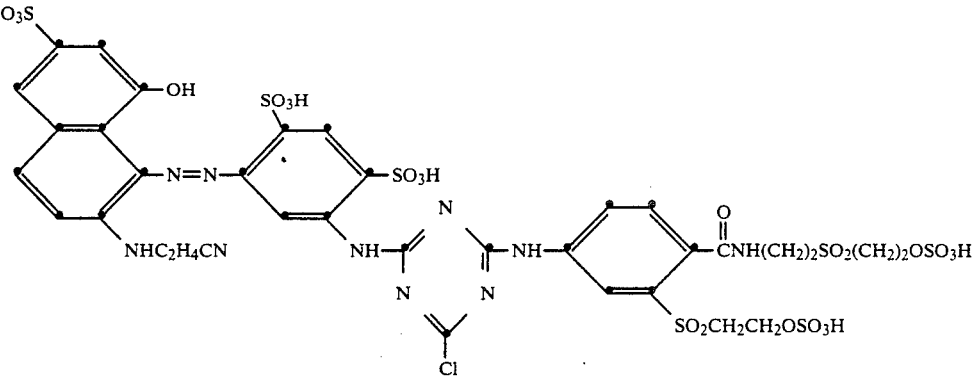 | (186) |
| 87 | 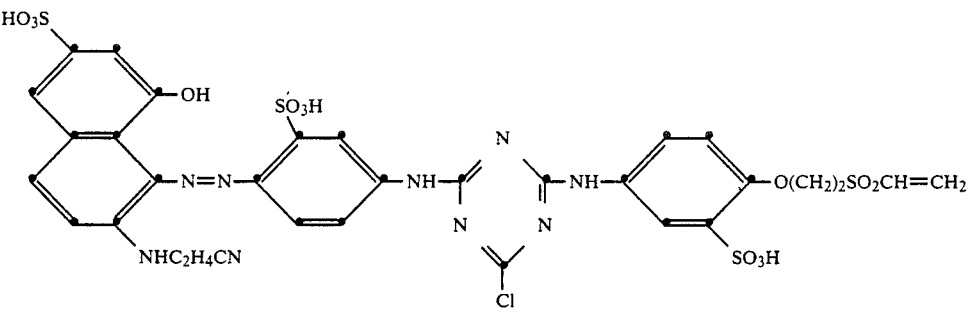 | (187) |
| 88 | 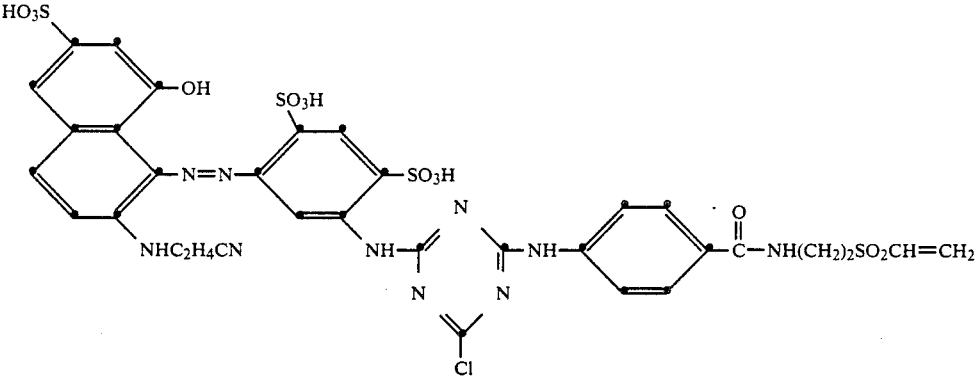 | (188) |
| 89 | 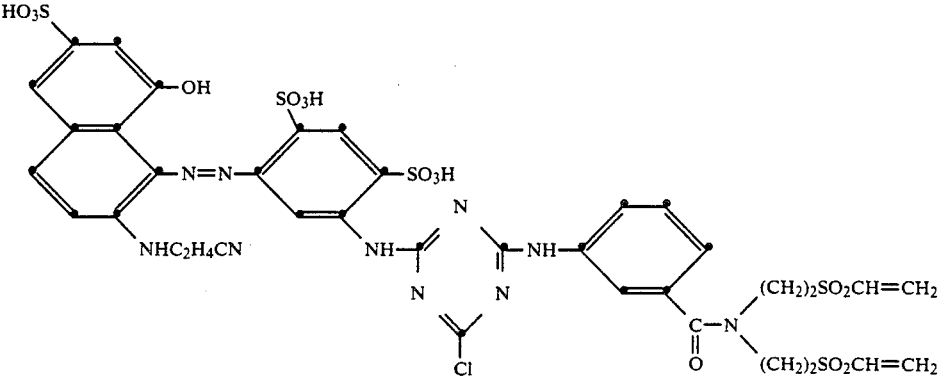 | (189) |

| Example | | Reactive dye |
|---|---|---|
| 90 | 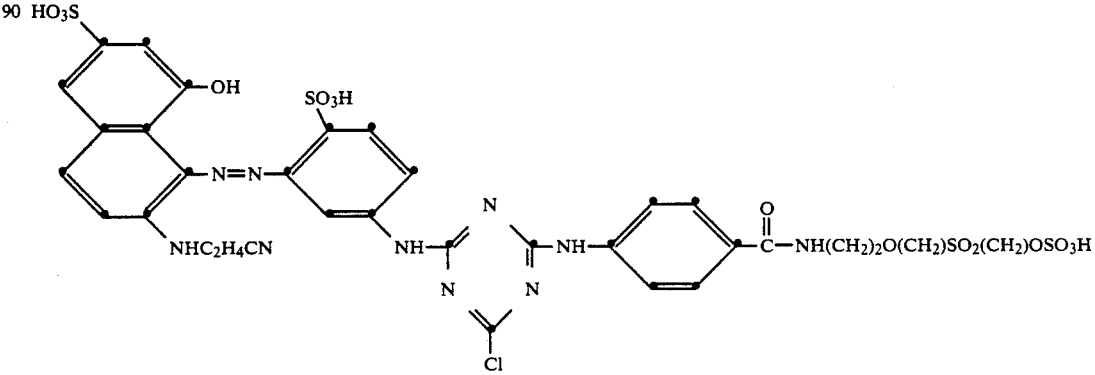 | (190) |
| 91 | 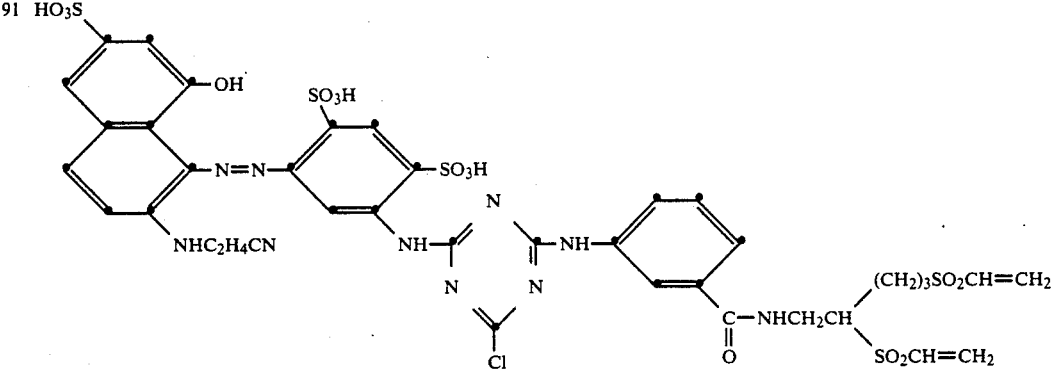 | (191) |
| 92 | 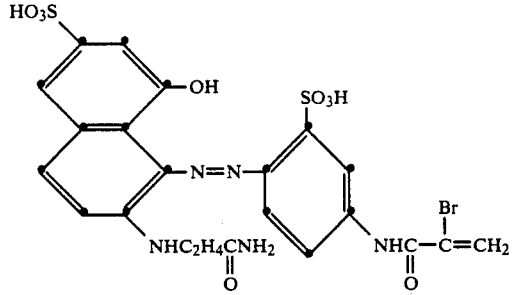 | (192) |
| 93 | 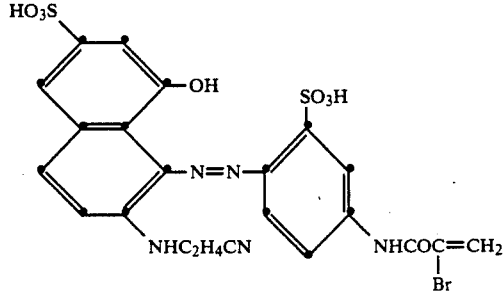 | (193) |

| Example | | Reactive dye |
|---|---|---|
| 94 | 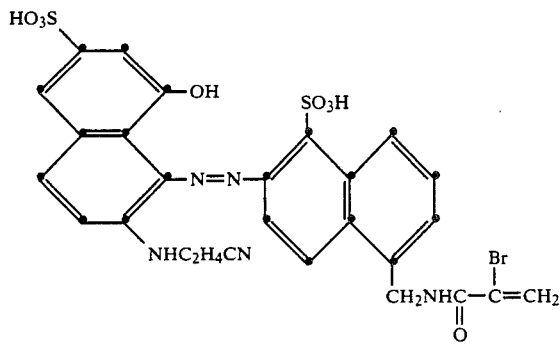 | (194) |
| 95 | 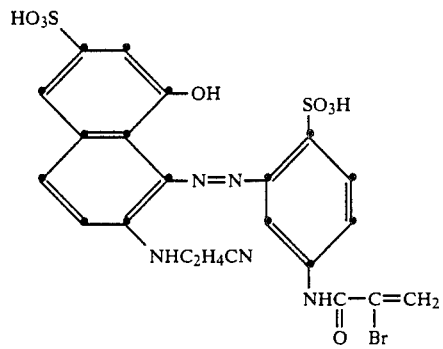 | (195) |
| 96 | 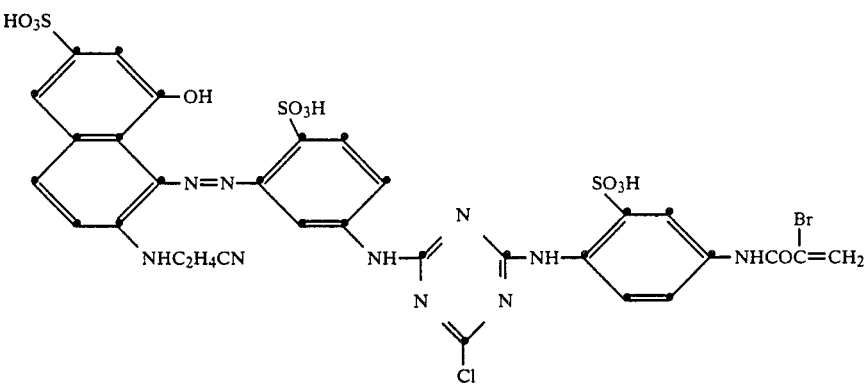 | (196) |
| 97 | 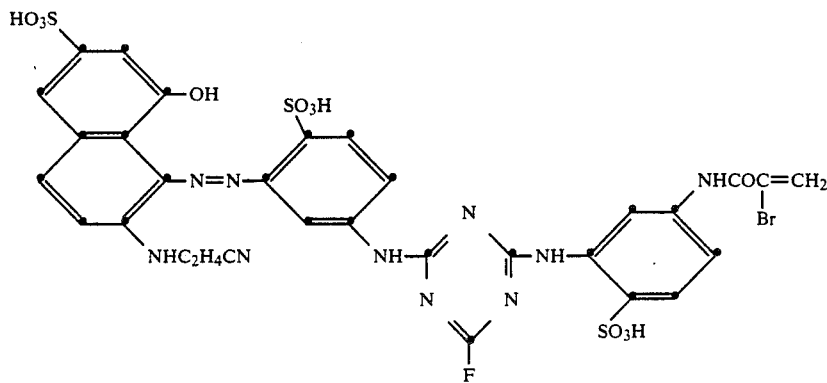 | (197) |

-continued
| Example | | Reactive dye |
|---|---|---|
| 98 | 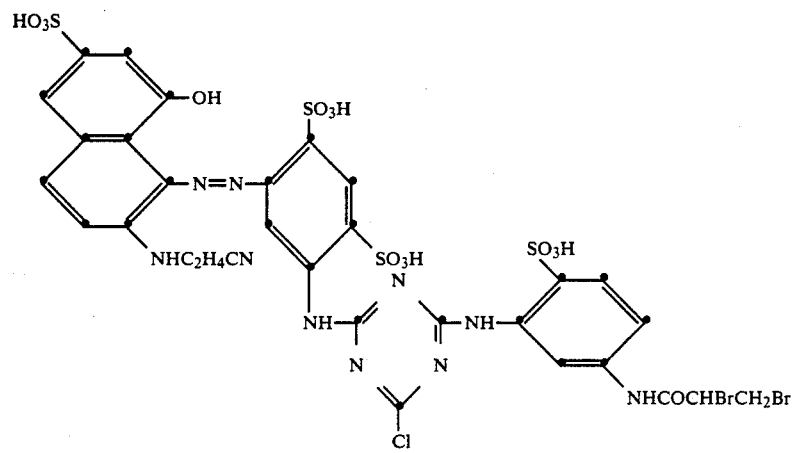 | (198) |
| 99 | 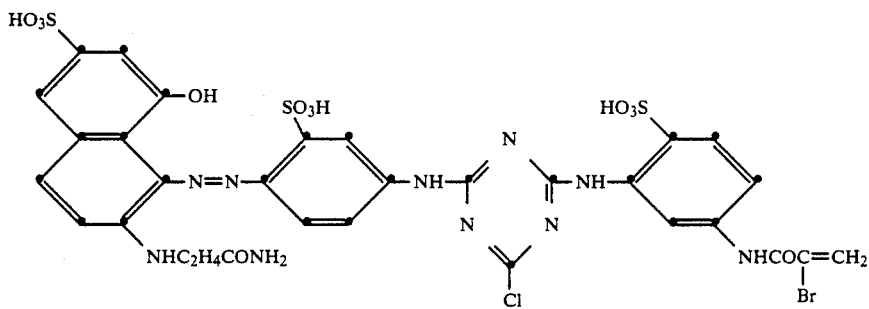 | (199) |
| 100 | 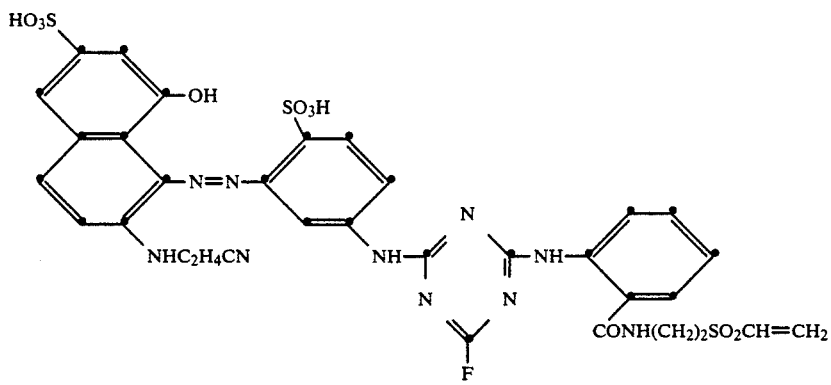 | (200) |
| 101 | 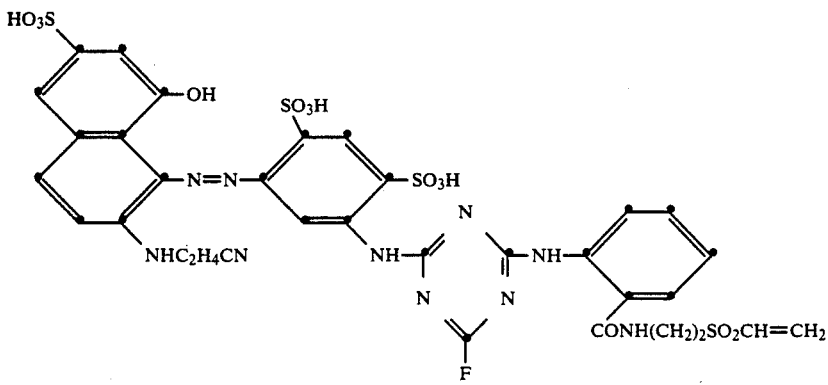 | (201) |

| Example | | Reactive dye |
|---|---|---|
| 102 | 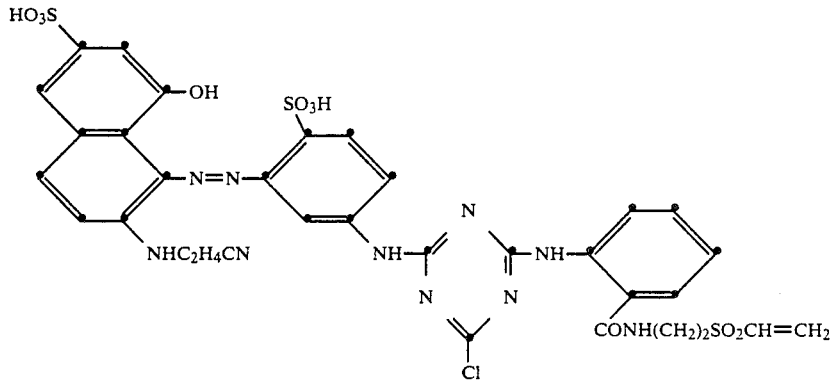 | (202) |
| 103 | 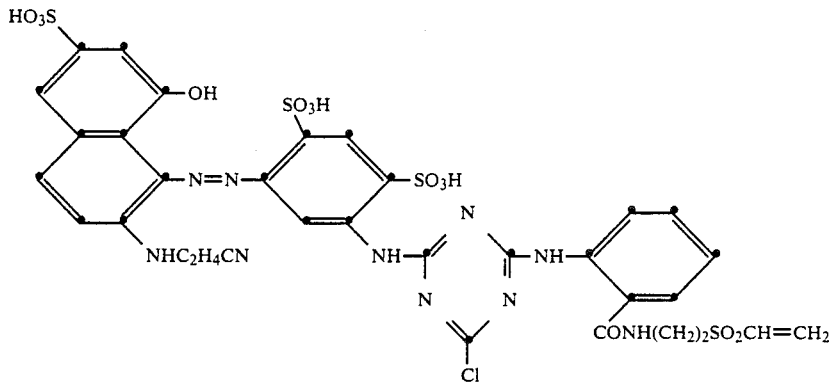 | (203) |
| 104 | 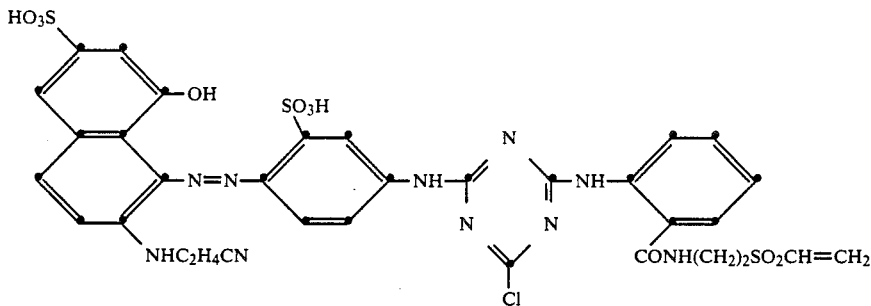 | (204) |
| 105 | 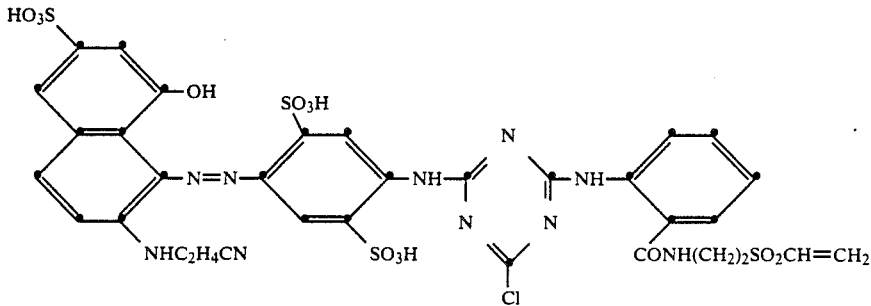 | (205) |

| Example | | Reactive dye |
|---|---|---|
| 106 | 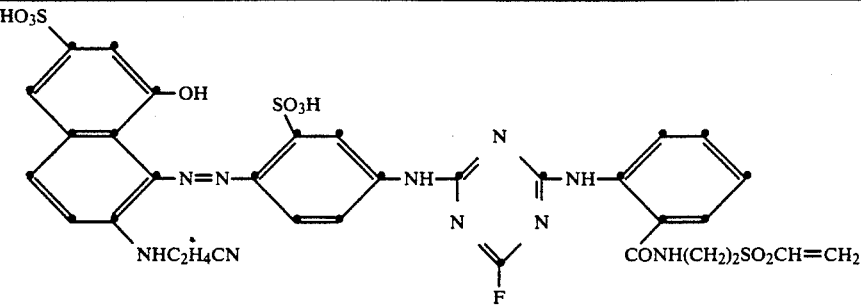 | (206) |
| 107 | 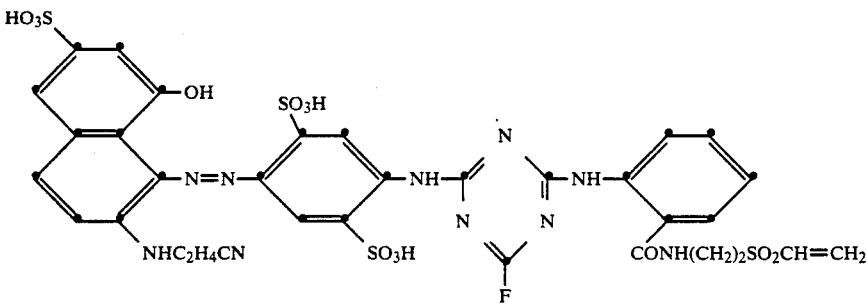 | (207) |

Dyeing Procedure I 2 parts of the dye obtained according to Example 1 are dissolved in 400 parts of water; 1500 parts of a solution containing 53 g of sodium chloride per liter are then added. This dyeing bath is entered at 40° C. with 100 parts of a cotton fabric. After 45 minutes, 100 parts of a solution containing 16 g of sodium hydroxide and 20 g of calcined sodium carbonate per liter are added. The temperature of the dyeing bath is maintained at 40° C. for another 45 minutes. The dyed goods are then rinsed, soaped with a nonionic detergent at boiling temperature for one quarter of an hour, rinsed again and dried.

Dyeing Procedure II 2 parts of the reactive dye obtained according to Example 1 are dissolved in 400 parts of water; 1500 parts of a solution containing 53 g of sodium chloride per liter are then added. This dyeing bath is entered at 35° C. with 100 parts of a cotton fabric. After 20 minutes, 100 parts of a solution containing 16 g of sodium hydroxide and 20 g of calcined sodium carbonate per liter are added. The temperature of the dyeing bath is maintained at 35° C. for another 15 minutes. The temperature is then increased to 60° C. over a period of 20 minutes. The temperature is maintained at 60° C. for another 35 minutes. The dyed goods are then rinsed, soaped with a nonionic detergent at boiling temperature for one quarter of an hour, rinsed again and dried.

Dyeing Procedure III 8 parts of the reactive dye obtained according to Example 1 are dissolved in 400 parts of water; 1400 parts of a solution containing 100 g of sodium sulfate per liter are then added. This dyeing bath is entered at 25° C. with 100 parts of a cotton fabric. After 10 minutes, 200 parts of a solution containing 150 g of trisodium phosphate per liter are added. The temperature of the dyeing bath is then increased to 60° C. over a period of 10 minutes. The temperature is maintained at 60° C. for another 90 minutes. The dyed goods are then rinsed, soaped with a nonionic detergent at boiling temperature for one quarter of an hour, rinsed again and dried.

Dyeing Procedure IV 4 parts of the reactive dye obtained according to Example 1 are dissolved in 50 parts of water. 50 parts of a solution containing 5 g of sodium hydroxide and 20 g of calcined sodium carbonate per liter are added. The resulting solution is used to pad a cotton fabric in such a manner that its weight increases by 70%, and the fabric is then wrapped around a batching roller. In this form, the cotton fabric is stored at room temperature for 3 hours. The dyed goods are then rinsed, soaped with a nonionic detergent at boiling temperature for one quarter of an hour, rinsed again and dried.

Dyeing Procedure V 6 parts of the reactive dye obtained according to Example 1 are dissolved in 50 parts of water. 50 parts of a solution containing 16 g of sodium hydroxide and 0.04 liter of waterglass (38°Bé) per liter are added. The resulting solution is used to pad a cotton fabric in such a manner that its weight increases by 70%, and the fabric is then wrapped around a batching roller. In this form, the cotton fabric is stored at room temperature for 10 hours. The dyed goods are then rinsed, soaped with a nonionic detergent at boiling temperature for one quarter of an hour, rinsed again and dried.

Dyeing Procedure VI 2 parts of the reactive dye obtained according to Example 1 are dissolved in 100 parts of water with the addition of 0.5 part of sodium m-nitrobenzenesulfonate. The resulting solution is used to impregnate a cotton fabric in such a manner that its weight increases by 75%, and the fabric is then dried. The fabric is then impregnated with a solution at 20° C. containing 4 g of sodium hydroxide and 300 g of sodium chloride per liter, squeezed down to a weight increase of 75%, the dyeing is steamed at 100° to 102° C. for 30 seconds, rinsed, soaped in a 0.3% boiling solution of a nonionic detergent for one quarter of an hour, rinsed and dried.

Dyeing Procedure VII 2 parts of the dye of Example 1, 160 parts of sodium sulfate and, as a buffer, 4 parts of $Na_2HPO_4.12H_2O$ and 1 part of $KH_2PO_4$ are added to 2,000 parts of water to give a dyeing bath having a pH of 7. 100 parts of a knitted fabric made of non-mercerized cotton are dipped into this bath. Over a period of 30 minutes, the temperature of the bath is brought to 130° C., and dyeing is carried out at this temperature for 60 minutes. The dyed goods are then removed from the bath, washed with water, soaped, washed again with water and dried. This gives a bordeaux-red dyeing.

Dyeing Procedure VIII 2 parts of the dye of Example 1, 2 parts of the known water-insoluble anthraquinone dye of the formula

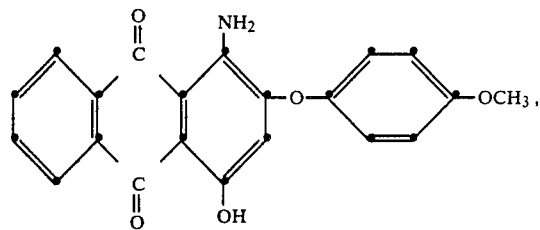

120 parts of sodium sulfate and, as a buffer, 4 parts of $Na_2HPO_4.12H_2O$ and 1 part of $KH_2PO_4$ are added to 2,000 parts of water. 100 parts of a polyester/cotton fabric (50:50) are dipped into the dyeing bath thus obtained and over a period of 30 minutes the temperature of the bath is brought to 130° C., at which temperature dyeing is carried out for 60 minutes. The dyed fabric is then removed from the bath, washed with water, soaped, washed again with water and dried. This gives an evenly dyed fabric. The dyeing bath is maintained at a pH of 7 before and during dyeing.

Printing Procedure I 3 parts of the reactive dye obtained according to Example 1 are quickly stirred into 100 parts of a stock thickener containing 50 parts of a 5% sodium alginate thickener, 27.8 parts of water, 20 parts of urea, 1 part of sodium m-nitrobenzenesulfonate and 1.2 parts of sodium bicarbonate. The printing paste thus obtained is used to print a cotton fabric, after which the printed material obtained is dried and steamed at 102° C. in saturated steam for 2 minutes. The printed fabric is then rinsed, if necessary soaped at the boiling temperature and rinsed again, and subsequently dried.

Printing Procedure II 5 parts of the reactive dye obtained according to Example 1 are quickly stirred into 100 parts of a stock thickener containing 50 parts of a 5% sodium alginate thickener, 36.5 parts of water, 10 parts of urea, 1 part of sodium m-nitrobenzenesulfonate and 2.5 parts of sodium bicarbonate. The printing paste thus obtained, the stability of which conforms to the technical requirements, is used to print a cotton fabric, after which the printed material obtained is dried and steamed at 102° C. in saturated steam for 8 minutes. The printed fabric is then rinsed, if necessary soaped at the boiling temperature and rinsed again, and subsequently dried.

What is claimed is:

1. A reactive dye of the formula

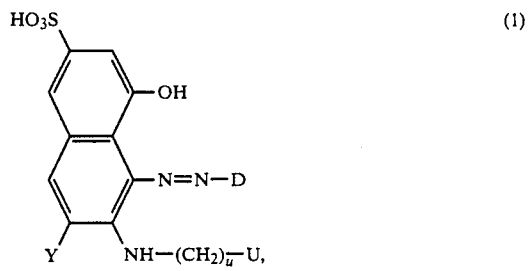

in which Y is hydrogen or sulfo, U is —CN, —CONH$_2$, —SO$_3$H, —OH or —OSO$_3$H, u is the number 2, 3, 4 or 5 and D is a radical of the formula

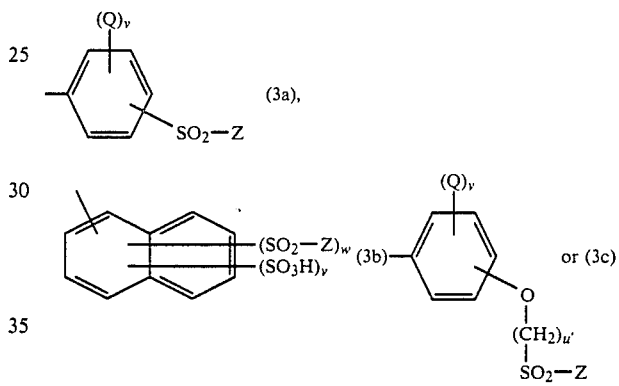

in which Q is $C_1$-$C_4$alkyl, $C_1$-$C_4$alkoxy, halogen, carboxyl or sulfo, v is the number 0, 1 or 2 and w is the number 1 or 2 and u' is the number 2, 3, 4 or 5, and Z is β-sulfatoethyl, β-thiosulfatoethyl, β-phosphatoethyl, β-acyloxyethyl, β-halogenoethyl or vinyl; or D is a radical of the formula

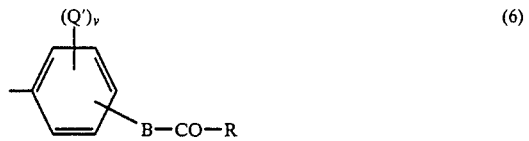

Q' is $C_1$-$C_4$alkyl, $C_1$-$C_4$alkoxy, halogen, carboxyl, sulfo or —SO$_2$—Z in which Z is as defined above, v is the number 0, 1 or 2, B is a direct bond or a radical —(CH$_2$)—$_n$ or —O—(CH$_2$)—$_n$; n is 1, 2, 3, 4, 5 or 6; R is a radical of the formula

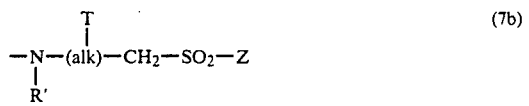

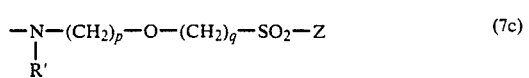

-continued

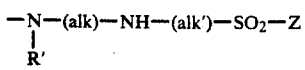 (7d)

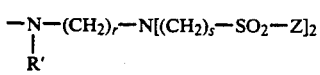 (7e)

or

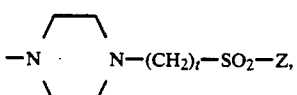 (7f)

in which R' is hydrogen or $C_1$-$C_6$alkyl, alk is an alkylene radical having 1 to 7 carbon atoms or branched isomers thereof, T is hydrogen, halogen, hydroxyl, sulfato, carboxyl, cyano, $C_1$-$C_4$alkanoyloxy, $C_1$-$C_4$alkoxycarbonyl, carbamoyl or a radical —$SO_2$—Z, V is hydrogen or $C_1$-$C_4$alkyl or a radical of the formula

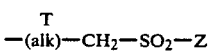

in which (alk) is as defined above, alk', independently of one another, are polymethylene radicals having 2 to 6 C atoms or branched isomers thereof, Z is as defined above, p, q, r and t, independently of one another, are each the number 1, 2, 3, 4, 5 or 6 and s is 2, 3, 4, 5 or 6.

2. A reactive dye of the formula

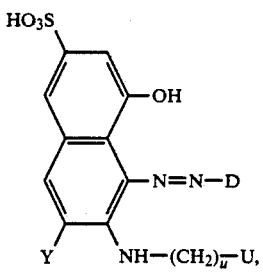 (1)

in which Y is hydrogen or sulfo, U is —CN, —$CONH_2$, —$SO_3H$, —OH or —$OSO_3H$, u is the number 2, 3, 4 or 5, and D is a radical of the formula

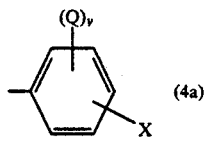 (4a)

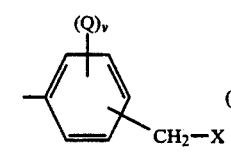 (4b) or (4c)

and X is a radical of the formula

—NHCOCBr=$CH_2$ (5a),

—NHCOCHBr$CH_2$Br (5b),

—NHCO—$(CH_2)_3SO_2$—Z (5c) or

—N($R_{11}$)—$SO_2$—Z (5d),

Q is $C_1$-$C_4$alkyl, $C_1$-$C_4$alkoxy, halogen, carboxyl or sulfo, v is the number 0, 1 or 2, $R_{11}$ is hydrogen, methyl or ethyl, x is the number 0 or 1, and Z is β-sulfatoethyl, β-thiosulfatoethyl, β-phosphatoethyl, β-acyloxyethyl, β-halogenoethyl or vinyl; or D is a radical of the formula

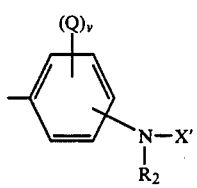 (9a)

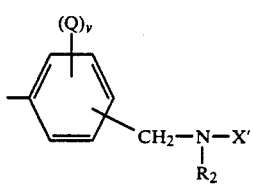 (9b)

or

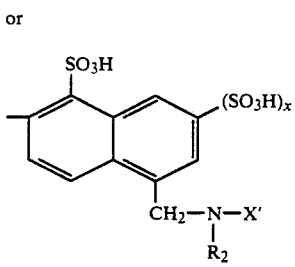 (9c)

in which Q, v and x are defined as given for formulae (4a), (4b) and (4c), $R_2$ is hydrogen, methyl, or ethyl, and X' is 2,4,5-trichloro-6-pyrimidinyl or 2,4-difluoro-5-chloro-6-pyrimidinyl, or X' is a radical of the formula

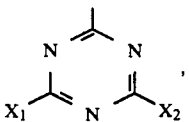 (10)

$X_1$ is fluorine or chlorine and $X_2$ is a radical of the formula

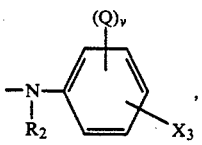 (11)

in which $R_2$, v and Q are defined as given for formulae (9a), (9b) and (9c) and $X_3$ is a radical of the formula —NHCOCBr=$CH_2$ (5a), —NHCOCHBr—$CH_2$Br (5b), —NHCO—$(CH_2)_3SO_2$—Z (5c) or —N($R_{11}$)—$SO_2$—Z (5d), $R_{11}$ is hydrogen, methyl or ethyl, and Z β-sulfatoethyl, β-thiosulfatoethyl, β-phosphatoethyl, β-acyloxyethyl, β-halogenoethyl or vinyl, or X' is a radical of the formula

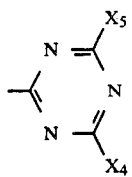 (12)

in which $X_4$ is fluorine, chlorine, bromine, sulfo, $C_1$-$C_4$alkylsulfonyl, phenylsulfonyl, carboxypyridinium, —NH$_2$ or $C_1$-$C_4$alkylamino, N,N-di-$C_1$-$C_4$alkylamino, phenylamino, N-$C_1$-$C_4$alkyl-N-phenylamino or naphthylamino, in which the alkyl radicals are unsubstituted or substituted by $C_1$-$C_4$alkoxy, cyano, halogen, hydroxyl, sulfo or sulfato, and the phenyl or naphthyl radical can be substituted by $C_1$-$C_4$alkyl, $C_1$-$C_4$alkoxy, halogen, carboxyl or sulfo; or is morpholino, or has the same meaning as $X_5$, independently thereof, and $X_5$ is a radical of the formula

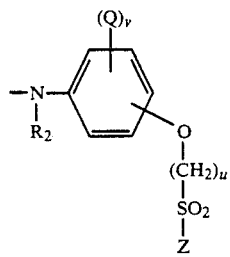 (13c)

in which Q, v, $R_2$, u and Z are defined as given above, or X' is a radical of the formula

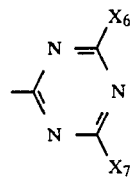 (14)

in which $X_6$ is fluorine, chlorine, bromine, sulfo, $C_1$-$C_4$alkylsulfonyl, phenylsulfonyl, carboxypyridinium, —NH$_2$ or $C_1$-$C_4$alkylamino, N,N-di-$C_1$-$C_4$alkylamino, phenylamino, N-$C_1$-$C_4$alkyl-N-phenylamino or naphthylamino, in which the alkyl radicals are unsubstituted or substituted by $C_1$-$C_4$alkoxy, cyano, halogen, hydroxyl, sulfo or sulfato, and the phenyl or naphthyl radical can be substituted by $C_1$-$C_4$alkyl, $C_1$-$C_4$alkoxy, halogen, carboxyl or sulfo; or is morpholino, or has the same meaning as $X_7$ independently thereof, and $X_7$ is a radical of the formula

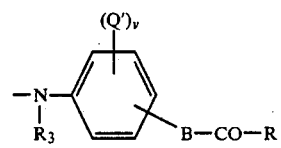 (15)

in which Q' is $C_1$-$C_4$alkyl, $C_1$-$C_4$alkoxy, halogen, carboxyl, sulfo, —SO$_2$—Z or sulfato, v is the number 0, 1 or 2, $R_3$ is hydrogen or $C_1$-$C_4$alkyl which is unsubstituted or substituted by halogen, hydroxyl, cyano, $C_1$-$C_4$alkoxy, $C_1$-$C_4$alkoxycarbonyl, carboxyl, sulfamoyl, sulfo or sulfato, B is a direct bond or a radical —(CH$_2$)—$_n$ or —O—(CH$_2$)—$_n$; n is 1, 2, 3, 4, 5 or 6; R is a radical of the formula

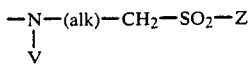 (7a)

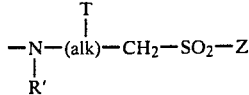 (7b)

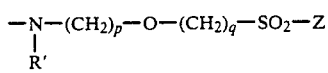 (7c)

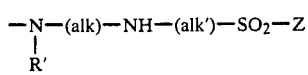 (7d)

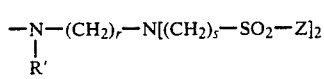 (7e)

or

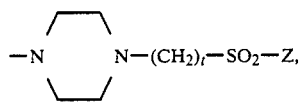 (7f)

in which R' is hydrogen or $C_1$-$C_6$alkyl, alk is an alkylene radical having 1 to 7 carbon atoms or branched isomers thereof, T is hydrogen, halogen, hydroxyl, sulfato, carboxyl or cyano, $C_1$-$C_4$alkanoyloxy, $C_1$-$C_4$alkoxycarbonyl, carbamoyl or a radical —SO$_2$—Z, V is hydrogen or $C_1$-$C_4$alkyl or a radical of the formula

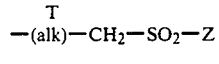

in which (alk) is as defined above, alk', independently of one another, are polymethylene radicals having 2 to 6 C atoms or branched isomers thereof, Z is as defined above, p, q, r and t, independently of one another, are each the number 1, 2, 3, 4, 5 or 6 and s is 2, 3, 4, 5 or 6, or $X_7$ is a radical of the formula (7a), (7b), (7c), (7d), (7e) or (7f) which is bound directly to the triazine ring and in which Z, alk, T, V, R', alk', p, q, r, s and t are as defined above.

3. A reactive dye according to claim 1, in which U is —CH, —CONH$_2$, —SO$_3$H or —OSO$_3$H.

4. A reactive dye according to claim 1, in which U is —CONH$_2$ or —CN.

5. A reactive dye according to claim 1, of the formula

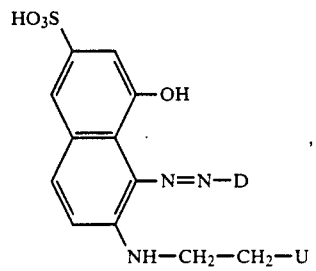 (2)

in which U is —CN or —CONH₂ and D is as defined in claim 1.

6. A reactive dye according to claim 2, in which U is —CH, —CONH₂, —SO₃H or —OSO₃H.

7. A reactive dye according to claim 2, in which U is —CONH₂ or —CN.

8. A reactive dye according to claim 2, of the formula

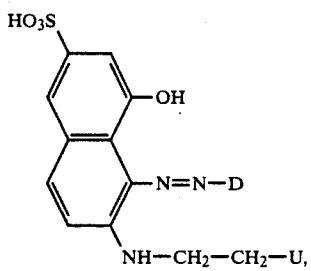
(2)

in which U is —CN or —CONH₂ and D is as defined in claim 2.

9. A reactive dye according to claim 5 in which D is a radical of the formula

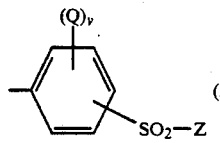
(3a),

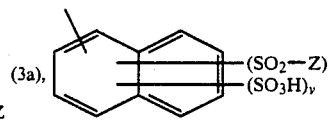
(3b)

in which Q is $C_1$-$C_4$alkyl, $C_1$-$C_4$alkoxy, halogen, carboxyl or sulfo, v is the number 0, 1 or 2 and w is the number 1 or 2 and u is the number 2, 3, 4 or 5, and Z is β-sulfatoethyl, β-thiosulfatoethyl, β-phosphatoethyl, β-acyloxyethyl, β-halogenoethyl or vinyl.

10. A reactive dye according to claim 8 in which D is a radical of the formula

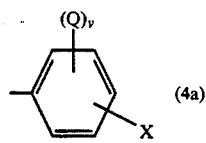
(4a)

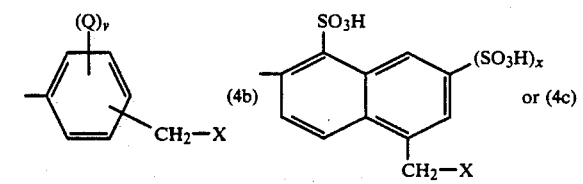
(4b) or (4c)

and X is a radical of the formula

—NHCOCBr=CH₂ (5a),

—NHCOCHBrCH₂Br (5a),

—NHCO—(CH₂)₃SO₂—Z (5c) or

—N(R₁₁)—SO₂—Z (5d),

Q is $C_1$-$C_4$alkyl, $C_1$-$C_4$alkoxy, halogen, carboxyl or sulfo, v is the number 0, 1 or 2, R₁₁ is hydrogen, methyl or ethyl, x is the number 0 or 1, and Z is β-sulfatoethyl, β-thiosulfatoethyl, β-phosphatoethyl, β-acyloxyethyl, β-halogenoethyl or vinyl.

11. A reactive dye according to claim 5 in which D is a radical of the formula

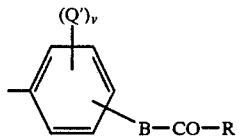
(6)

Q' is $C_1$-$C_4$alkyl, $C_1$-$C_4$alkoxy, halogen, carboxyl, sulfo or —SO₂—Z in which Z is β-sulfatoethyl, β-thiosulfatoethyl β-phosphatoethyl, β-acyloxyethyl, β-halogenethyl or vinyl, v is the number 0, 1 or 2, B is a direct bond or a radical —(CH₂)—ₙ or —O—(CH₂)—ₙ; n is 1, 2, 3, 4, 5 or 6; R is a radical of the formula

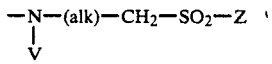
(7a)

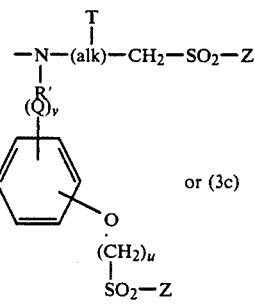
(7b)

or (3c)

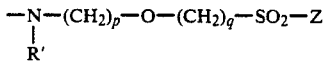
(7c)

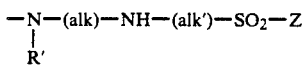
(7d)

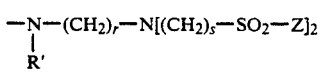
(7e)

or

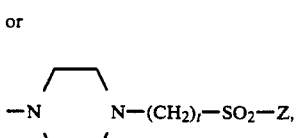
(7f)

in which R' is hydrogen or $C_1$-$C_6$alkyl, alk is an alkylene radical having 1 to 7 carbon atoms or branched isomers thereof, T is hydrogen, halogen, hydroxyl, sulfato, carboxyl, cyano, $C_1$-$C_4$alkanoyloxy, $C_1$-$C_4$alkoxycarbonyl, carbamoyl or a radical —SO₂—Z, V is hydrogen or $C_1$-$C_4$alkyl or a radical of the formula

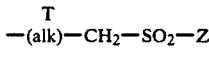

in which (alk) is as defined above, alk', independently of one another, are polymethylene radicals having 2 to 6 C atoms or branched isomers thereof, Z is as defined above, p, q, r and t, independently of one another, are each the number 1, 2, 3, 4, 5 or 6 and s is 2, 3, 4, 5 or 6.

12. A reactive dye according to claim 11, in which D is a radical of the formula

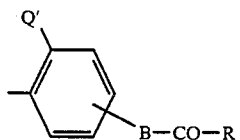
(8)

Q' is hydrogen or sulfo, B is a direct bond or a radical —CH$_2$— or —O—CH$_2$CH$_2$—, R is a radical of the formula

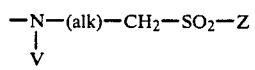
(7a)

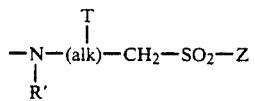
(7b)

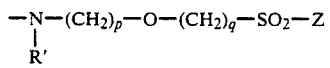
(7c)

or

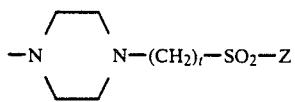
(7f),

Z is β-sulfatoethyl, β-chloroethyl or vinyl, alk is methylene or ethylene, T is hydrogen and V is hydrogen or a radical of the formula

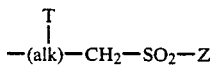

in which alk, T and Z are as defined above, or alk is a radical of the formula

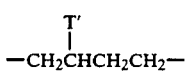

T' is a radical —SO$_2$Z in which Z is as defined above, and V is hydrogen, R' is hydrogen, p is the number 2, q is the number 2 and t is the number 3.

13. A reactive dye according to claim 8, wherein D is a radical of the formula

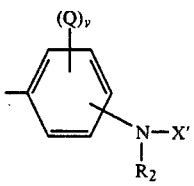
(9a)

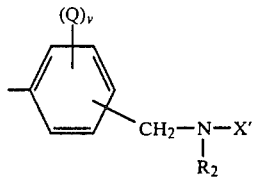
(9b)

or

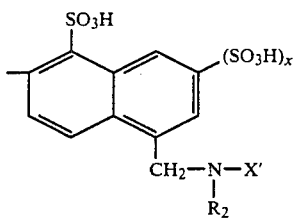
(9c)

in which Q is C$_1$-C$_4$alkyl, C$_1$-C$_4$alkoxy, halogen, carboxyl or sulfo, R$_2$ is hydrogen, methyl, or ethyl, v is the number 0, 1 or 2, x is the number 0 or 1 and X' is 2,4,5-trichloro-6-pyrimidinyl or 2,4-difluoro-5-chloro-6-pyrimidinyl.

14. A reactive dye according to claim 8, wherein D is a radical of the formula

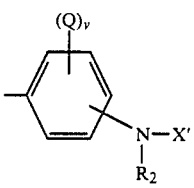
(9a)

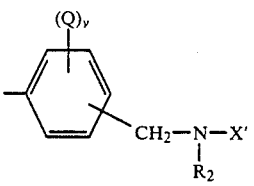
(9b)

or

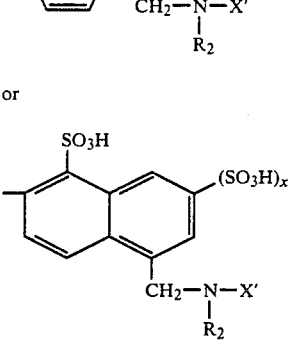
(9c)

in which Q is C$_1$-C$_4$alkyl, C$_1$-C$_4$alkoxy, halogen, carboxyl or sulfo, R$_2$ is hydrogen, methyl, or ethyl, v is the number 0, 1 or 2, x is the number 0 or 1 and X' is a radical of the formula

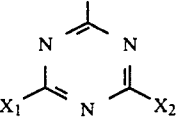
(10)

in which X$_1$ is fluorine or chlorine and X$_2$ is a radical of the formula

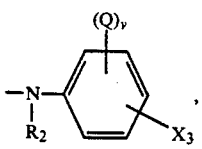
(11)

in which $R_2$ is hydrogen, methyl or ethyl, Q is $C_1$-$C_4$alkyl, $C_1$-$C_4$alkoxy, halogen, carboxyl or sulfo, and v is the number 0, 1 or 2, and $X_3$ is a radical of the formula —NHCOCBr=CH$_2$ (5a), —NHCOCHBr—CH$_2$Br (5b), —NHCO—(CH$_2$)$_3$SO$_2$—Z (5c) or —N(R$_{11}$)—SO$_2$—Z (5d), $R_{11}$ is hydrogen, methyl or ethyl, and Z β-sulfatoethyl, β-thiosulfatoethyl, β-phosphatoethyl, β-acyloxyethyl, β-halogenoethyl or vinyl.

15. A reactive dye according to claim 8, wherein D is a radical of the formula

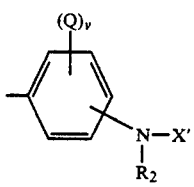
(9a)

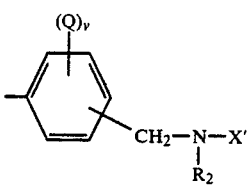
(9b)

or

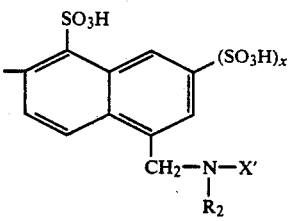
(9c)

in which Q is $C_1$-$C_4$alkyl, $C_1$-$C_4$alkoxy, halogen, carboxyl or sulfo, —SO$_2$—Z R$_2$ is hydrogen, methyl, or ethyl, v is the number 0, 1 or 2, x is the number 0 or 1 and X′ is a radical of the formula

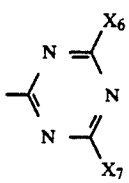
(14)

in which X$_6$ is fluorine, chlorine, bromine, sulfo, $C_1$-$C_4$alkylsulfonyl, phenylsulfonyl, carboxypyridinium, —NH$_2$ or $C_1$-$C_4$alkylamino, N,N-di-$C_1$-$C_4$alkylamino, phenylamino, N-$C_1$-$C_4$alkyl-N-phenylamino or naphthylamino, in which the alkyl radicals are unsubstituted or substituted by $C_1$-$C_4$alkoxy, cyano, halogen, hydroxyl, sulfo or sulfato, and the phenyl or naphthyl radical can be substituted by $C_1$-$C_4$alkyl, $C_1$-$C_4$alkoxy, halogen, carboxyl or sulfo; or is morpholino, or has the same meaning as X$_7$ independently thereof, and X$_7$ is a radical of the formula

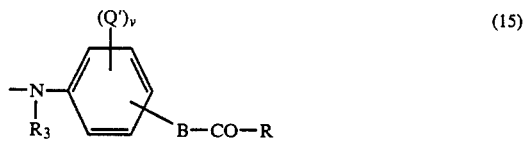
(15)

in which Q′ is $C_1$-$C_4$alkyl, $C_1$-$C_4$alkoxy, halogen, carboxyl, sulfo or sulfato, v is the number 0, 1 or 2, R$_3$ is hydrogen or $C_1$-$C_4$alkyl which can be substituted by halogen, hydroxyl, cyano, $C_1$-$C_4$alkoxy, $C_1$-$C_4$alkoxycarbonyl, carboxyl, sulfamoyl, sulfo or sulfato, B is a direct bond or a radical —(CH$_2$)—$_n$ or —O—(CH$_2$)—$_n$; n is 1, 2, 3, 4, 5 or 6; R is a radical of the formula

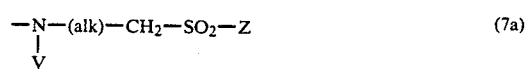
(7a)

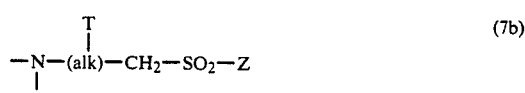
(7b)

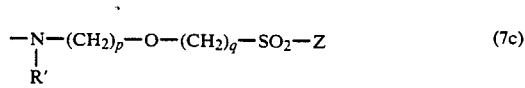
(7c)

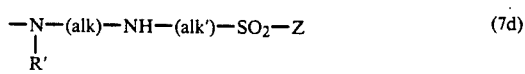
(7d)

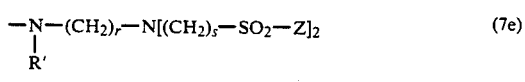
(7e)

or

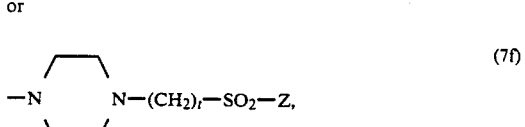
(7f)

in which R′ is hydrogen or $C_1$-$C_6$alkyl, alk is an alkylene radical having 1 to 7 carbon atoms or branched isomers thereof, T is hydrogen, halogen, hydroxyl, sulfato, carboxyl or cyano, $C_1$-$C_4$alkanoyloxy, $C_1$-$C_4$alkoxycarbonyl, carbamoyl or a radical —SO$_2$—Z, V is hydrogen or $C_1$-$C_4$alkyl or a radical of the formula

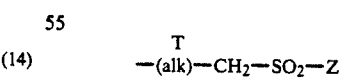

in which (alk) is as defined above, alk′, independently of one another, are polymethylene radicals having 2 to 6 C atoms or branched isomers thereof, Z is β-sulfatoethyl, β-thiosulfatoethyl, β-phosphatoethyl, β-acyloxyethyl, β-halogenoethyl or vinyl, p, q, r and t, independently of one another, are each the number 1, 2, 3, 4, 5 or 6 and s is 2, 3, 4, 5 or 6, or X$_7$ is a radical of the formula (7a), (7b), (7c), (7d), (7e) or (7f) which is bound directly to the triazine ring and in which Z, alk, T, V, R′, alk′, p, q, r, s and t are as defined above.

16. A reactive dye according to claim 15, in which $X_7$ is a radical of the formula (7a), (7b), (7c) or (7f), Z is β-sulfatoethyl, β-chloroethyl or vinyl, alk is methylene or ethylene, T is hydrogen and V is hydrogen or a radical of the formula

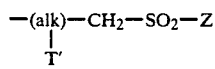

in which alk is a radical

T' is a radical —SO$_2$Z in which Z is as defined above, R' is hydrogen, p and q are each the number 2 and t is the number 3.

17. A reactive dye according to claim 15, in which $X_7$ is a radical of the formula

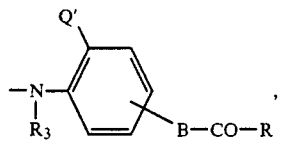

(16)

$R_3$ is hydrogen or $C_1$-$C_4$alkyl, which can be substituted by halogen, hydroxyl, cyano, $C_1$-$C_4$alkoxy, $C_1$-$C_4$alkoxycarbonyl, carboxyl, sulfamoyl, sulfo or sulfato, B is a direct bond or a radical —CH$_2$— or —O—CH$_2$CH$_2$—, R is a radical of the formula (7a), (7b), (7c) or (7f), Z is βsulfatoethyl, βchloroethyl or vinyl, alk is methylene or ethylene, T is hydrogen and V is hydrogen or a radical of the formula

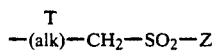

in which alk, T and Z are as defined above or alk is a radical

T' is a radical —SO$_2$Z in which Z is as defined above, and R' and V are each hydrogen, p is the number 2, m is the number 2 and q is the number 3.

18. A reactive dye according to claim 17, in which $R_3$ is hydrogen, methyl or ethyl.

19. A reactive dye according to claim 15 in which $X_7$ is a radical of the formula

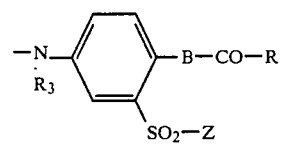

(17)

$R_3$ is hydrogen, methyl or ethyl, B is a direct bond or a radical —CH$_2$— or —O—CH$_2$CH$_2$—, R is a radical of the formula (7a), (7b), (7c) or (7f), Z is β-sulfatoethyl, β-chloroethyl or vinyl, alk is methylene or ethylene, T is hydrogen and V is hydrogen or a radical of the formula

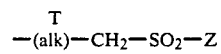

in which alk, T and Z are as defined above, or alk is a radical,

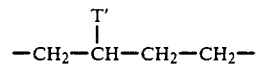

T' is a radical —SO$_2$—Z in which Z is as defined above, and R' is hydrogen, p and q are each the number 2 and t is the number 3.

20. A reactive dye according to claim 1 of the formula

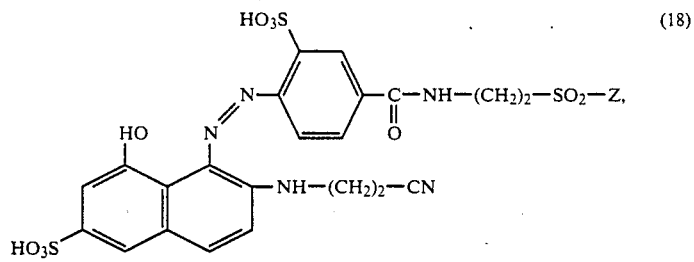

(18)

in which Z is β-sulfatoethyl, β-chloroethyl or vinyl.

21. A reactive dye according to claim 5 of the formula

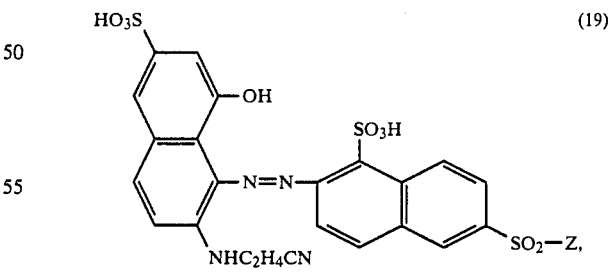

(19)

in which Z is β-sulfatoethyl, β-chloroethyl or vinyl.

22. A reactive dye according to claim 1, in which U is —CN.

23. A reactive dye according to claim 2, in which U is —CH.

* * * * *